US010032125B1

(12) United States Patent
Berg et al.

(10) Patent No.: US 10,032,125 B1
(45) Date of Patent: *Jul. 24, 2018

(54) AIRBORNE FULFILLMENT CENTER UTILIZING UNMANNED AERIAL VEHICLES FOR ITEM DELIVERY

(71) Applicant: Amazon Technologies, Inc., Seattle, WA (US)

(72) Inventors: Paul William Berg, Seattle, WA (US); Scott Isaacs, Bellevue, WA (US); Kelsey Lynn Blodgett, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,197

(22) Filed: Mar. 2, 2016

Related U.S. Application Data

(63) Continuation of application No. 14/580,046, filed on Dec. 22, 2014, now Pat. No. 9,305,280.

(51) Int. Cl.
*G06Q 10/08* (2012.01)
*G06Q 30/02* (2012.01)
(Continued)

(52) U.S. Cl.
CPC ............ *G06Q 10/083* (2013.01); *B64B 1/00* (2013.01); *B64C 39/024* (2013.01); *B64D 1/08* (2013.01);
(Continued)

(58) Field of Classification Search
CPC ........ B64C 2201/141; B64C 2201/128; B64C 2201/00; B64C 2201/126; B64C 39/00;
(Continued)

(56) References Cited

U.S. PATENT DOCUMENTS 5,521,817 A 5/1996 Burdoin et al.
6,895,301 B2 5/2005 Mountz
(Continued)

FOREIGN PATENT DOCUMENTS

WO 2014080386 A8 4/2015

OTHER PUBLICATIONS

Webster, Michael "DOD proposes new giant spy airship—or is it already here?" Mar. 16, 2009, https://wwwprlog.org/10199736-dod-proposes-new-giant-spy-airshipor-is-it-already-here . . . , downloaded from the internet on Apr. 13, 2017, 3 pages.

*Primary Examiner* — Thomas G Black
*Assistant Examiner* — Demetra R Smith-Stewart
(74) *Attorney, Agent, or Firm* — Athorus, PLLC

(57) ABSTRACT

Described is an airborne fulfillment center ("AFC") and the use of unmanned aerial vehicles ("UAV") to deliver items from the AFC to users. For example, the AFC may be an airship that remains at a high altitude (e.g., 45,000 feet) and UAVs with ordered items may be deployed from the AFC to deliver ordered items to user designated delivery locations. As the UAVs descend, they can navigate horizontally toward a user specified delivery location using little to no power, other than to stabilize the UAV and/or guide the direction of descent. Shuttles (smaller airships) may be used to replenish the AFC with inventory, UAVs, supplies, fuel, etc. Likewise, the shuttles may be utilized to transport workers to and from the AFC.

20 Claims, 13 Drawing Sheets

(51) Int. Cl.
  *G08G 5/00* (2006.01)
  *B64C 39/02* (2006.01)
  *B64B 1/00* (2006.01)
  *B64D 1/08* (2006.01)
  *B64D 5/00* (2006.01)
  *G05D 1/10* (2006.01)

(52) U.S. Cl.
  CPC ....... G06Q 30/0265 (2013.01); G08G 5/0069 (2013.01); *B64C 2201/021* (2013.01); *B64C 2201/027* (2013.01); *B64C 2201/126* (2013.01); *B64C 2201/128* (2013.01); *B64C 2201/14* (2013.01); *B64D 5/00* (2013.01); *G05D 1/104* (2013.01)

(58) Field of Classification Search
  CPC .... G05D 1/0088; G05D 1/101; G05D 1/0202; G05D 1/042; G05D 1/0808; G08G 5/0069; G08G 5/0065; B60L 2200/10
  See application file for complete search history.

(56) References Cited

U.S. PATENT DOCUMENTS

| | | | |
|---|---|---|---|
| 6,950,722 B2 | 9/2005 | Mountz | |
| 7,059,566 B2 | 6/2006 | Byers et al. | |
| 7,735,752 B1 | 6/2010 | Songer et al. | |
| 8,596,571 B2 * | 12/2013 | Goelet | B64B 1/06 244/13 |
| 9,164,506 B1 | 10/2015 | Zang | |
| 9,305,280 B1 * | 4/2016 | Berg | G06Q 10/083 |
| 9,348,333 B1 * | 5/2016 | Buchmueller | G05D 1/0011 |
| 9,471,059 B1 | 10/2016 | Wilkins | |
| 2003/0213868 A1 | 11/2003 | Brunner et al. | |
| 2008/0210810 A1 * | 9/2008 | Parmley | B64B 1/70 244/30 |
| 2009/0072078 A1 * | 3/2009 | Choi | B64B 1/06 244/30 |
| 2009/0294573 A1 | 12/2009 | Wilson et al. | |
| 2010/0102164 A1 * | 4/2010 | Brutoco | B64B 1/06 244/30 |
| 2011/0084162 A1 | 4/2011 | Goossen et al. | |
| 2011/0228047 A1 | 9/2011 | Markham et al. | |
| 2012/0226394 A1 | 9/2012 | Marcus | |
| 2012/0248241 A1 * | 10/2012 | Goelet | B64B 1/06 244/30 |
| 2012/0302160 A1 | 11/2012 | Silny et al. | |
| 2013/0334371 A1 | 12/2013 | Potter et al. | |
| 2014/0026840 A1 | 1/2014 | Okada et al. | |
| 2014/0032034 A1 | 1/2014 | Raptopoulos et al. | |
| 2014/0200759 A1 * | 7/2014 | Lu | B60D 1/245 701/28 |
| 2014/0254896 A1 | 9/2014 | Zhou et al. | |
| 2014/0263840 A1 | 9/2014 | Potter et al. | |
| 2014/0277854 A1 | 9/2014 | Jones et al. | |
| 2014/0344118 A1 | 11/2014 | Parpia et al. | |
| 2014/0354809 A1 | 12/2014 | Shondel | |
| 2015/0120094 A1 * | 4/2015 | Kimchi | B64C 39/024 701/3 |
| 2015/0183528 A1 | 7/2015 | Walsh et al. | |
| 2015/0336671 A1 | 11/2015 | Winn et al. | |
| 2015/0339933 A1 | 11/2015 | Batla et al. | |
| 2015/0379874 A1 | 12/2015 | Ubhi et al. | |
| 2016/0054733 A1 | 2/2016 | Hollida et al. | |
| 2016/0107750 A1 * | 4/2016 | Yates | B64C 39/024 244/2 |
| 2016/0156406 A1 * | 6/2016 | Frolov | H04W 16/28 455/431 |
| 2016/0180719 A1 | 6/2016 | Wouhaybi et al. | |
| 2016/0214717 A1 | 7/2016 | Silva | |
| 2016/0253808 A1 | 9/2016 | Metzler et al. | |
| 2016/0307448 A1 * | 10/2016 | Salnikov | B64C 39/024 |
| 2016/0309124 A1 | 10/2016 | Yang et al. | |
| 2016/0364989 A1 | 12/2016 | Speasl et al. | |
| 2016/0371985 A1 | 12/2016 | Kotecha | |

* cited by examiner

AIRBORNE FULFILLMENT CENTER UTILIZING UNMANNED AERIAL VEHICLES FOR ITEM DELIVERY

This application claims the benefit of U.S. application Ser. No. 14/580,046, filed Dec. 22, 2014, entitled "Airborne Fulfillment Center Utilizing Unmanned Aerial Vehicles For Item Delivery," now U.S. Pat. No. 9,305,280, which is incorporated by reference herein in its entirety.

BACKGROUND

Many companies package items and/or groups of items together for a variety of purposes, such as e-commerce and mail-order companies that package items (e.g., books, CDs, apparel, food, etc.) to be shipped to fulfill orders from users. Retailers, wholesalers, and other product distributors (which may collectively be referred to as distributors) typically maintain an inventory of various items that may be ordered by users. A ground-based building, such as a materials handling facility, may maintain and process and ship such inventory.

Typically ordered items are packed in shipping packages (e.g., corrugated boxes) and shipped to the user's residence or place of business. Physical delivery of items to user specified locations has improved dramatically over the years, with some retailers offering next day delivery of ordered items. The final or last mile delivery of physical items to a user specified location is traditionally accomplished using a human controlled truck, bicycle, cart, etc. For example, a user may order an item for delivery to their home. The item may be picked from a ground-based materials handling facility, packed and shipped to the user for final delivery by a shipping carrier. The shipping carrier will load the item onto a truck that is driven by a human to the final delivery location and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
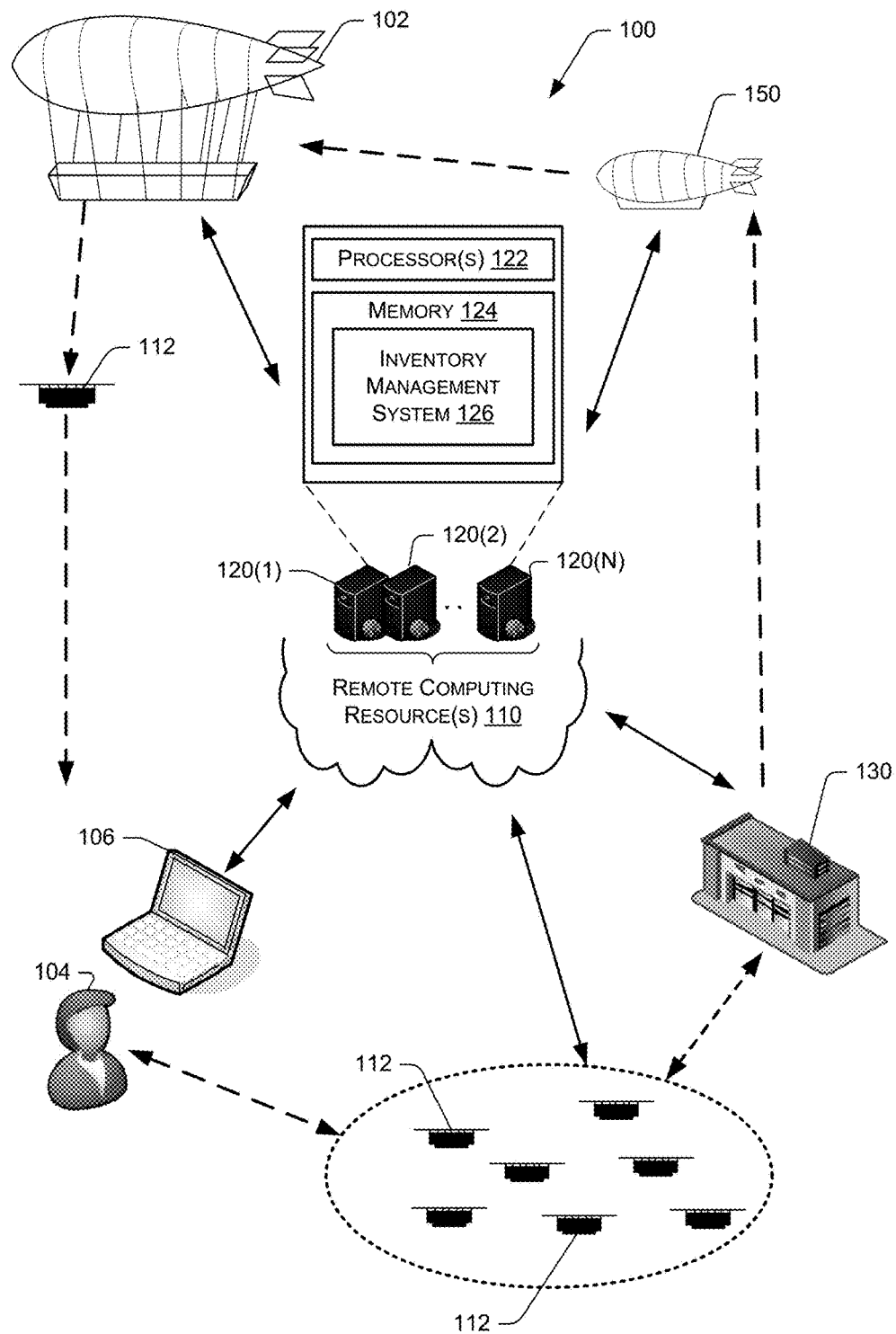
FIG. 1 is a block diagram of a delivery environment that includes an airborne fulfillment center, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes systems and methods for utilizing an aerial fulfillment center ("AFC") and unmanned aerial vehicles ("UAV") to facilitate delivery of ordered items to users. An AFC may be a fulfillment center that is supported by and/or incorporated into an airship. An airship, or dirigible, is a type of aerostat or lighter-than-air aircraft which can navigate through the air under its own power. Airships gain their lift from gas that is less dense than the surrounding air, such as helium or hot air.

An AFC may be positioned at an altitude above a metropolitan area and be designed to maintain an inventory of items that may be purchased by a user and delivered to the user by a UAV that is deployed from the AFC. For example, a user may browse an e-commerce website and place an order for an item that is in the inventory of the AFC. Upon placing the order for the item, fulfillment instructions may be sent to the AFC and a UAV within the AFC may engage the item for delivery to the user. When the UAV departs the AFC, it may descend from the high altitude of the AFC using little or no power other than to guide the UAV towards its delivery destination and/or to stabilize the UAV as it descends.

When the UAV approaches earth, the UAV may engage the motors of the UAV and utilize the lifting forces generated by the motors and corresponding propellers of the UAV to slow the descent of the UAV and to complete navigation to the user specified delivery location. When the UAV reaches the delivery location, it may disengage the ordered item and complete the delivery.

After completing an item delivery, the UAV may navigate to a nearby ground based materials handling facility or a shuttle replenishment location. Because of the high altitude of the AFC, navigation by a UAV back to the AFC may not be feasible, or an efficient use of power. Accordingly, a replenishment shuttle may be provided at a shuttle replenishment location that is configured to transport inbound items (e.g., UAVs, inventory, workers, supplies, fuel) to the AFC and retrieve outbound items (e.g., overstock inventory, transshipments, workers, waste) from the AFC. For example, the replenishment shuttle may be another, smaller, airship that is used to transport items to and from the AFC.

By utilizing an AFC for the storage and delivery of items using UAVs, the power required to complete an item delivery is substantially reduced. Rather than the UAV having to operate at power from the time it departs the materials handling facility to the delivery location and back to the materials handling facility (or another location), the UAV may be deployed from the AFC and descend under the forces of gravity toward a delivery location using little to no power. Only as the UAV approaches earth does it need to fully engage the UAV motors to maintain flight and complete delivery of the item.

The use of an AFC and shuttles also provides another benefit in that the AFC can remain airborne for extended periods of time. In addition, because the AFC is airborne, it is not limited to a fixed location like a traditional ground based materials handling facility. In contrast, it can navigate to different areas depending on a variety of factors, such as weather, expected demand, and/or actual demand.

An AFC may navigate to an area based on various positioning factors. For example, a temporal event (e.g., a football game) may be expected to produce a demand for certain types of items (e.g., sporting paraphernalia, food products, etc.). In advance of the event, the items may be delivered to the AFC in a quantity sufficient to satisfy the expected demand and the AFC may navigate to a position such that UAVs deployed from the AFC can safely navigate to the location of the event and deliver the items, thereby satisfying the demand. In some implementations, the AFC may navigate to a lower altitude and provide advertising for the temporal event or for other occasions (e.g., product announcements, product releases, sales).

As still another benefit, items may be delivered within minutes of a user placing an order. For example, a user may place an order for delivery of item A, which is maintained in the inventory of an AFC within a defined distance from the user. Item A may be picked from inventory, engaged by a UAV and the UAV may be deployed from the AFC. The picking of item A through deployment may be completed within minutes of the user's order. In some implementations, some UAVs may be pre-engaged with inventory items so that when an order for such an item is received, a UAV with the engaged inventory can be immediately deployed, further reducing the delivery time.

Deployed UAVs may quickly descend toward a user specified delivery location (e.g., the location of the user) and deliver the item. This speed of delivery provides near instant gratification to users for item purchases and greatly increases the breadth of items that can be delivered. For example, perishable items or even prepared meals can be delivered in a timely fashion to a user. In general, any item that can be carried by a UAV may be delivered using the implementations discussed herein.

An inventory management system may be configured to communicate (e.g., wirelessly) with the AFC, shuttle(s), and/or UAVs. In various implementations, the general activities of the AFC, shuttles(s) and/or UAVs (e.g., related to the delivery of items, the replenishment of inventory and/or UAVs to the AFC, the travel of UAVs to and from the designated delivery locations, etc.) may be coordinated by the inventory management system. For example, the inventory management system may receive or determine schedule data for the travel of the shuttles to and from the AFC. In various implementations, the inventory management system may also receive tracking data (e.g., GPS) regarding the locations of the AFCs, shuttles and/or UAVs and use that data for various purposes (e.g., status monitoring, answering location status requests, sending notifications regarding the current location of the AFCs, shuttles, UAVs).

FIG. 1 is a block diagram of a delivery environment 100 that includes an AFC 102, according to an implementation. As will be described in more detail below, an AFC 102 may be utilized to store inventory items and facilitate UAV delivery of ordered items to users.

The delivery environment 100 includes a user interface that allows a user 104 to place an order for an item that is to be delivered to the user. The user interface may be a graphical user interface, an audio only interface, a multi-mode interface, or any other interface for interacting with the user 104. The user interface may be provided to the user 104 through any type of electronic device 106, such as a tablet, desktop, laptop, smart phone, personal digital assistant, netbook, etc. The user interface may be delivered to the electronic device 106 by one or more remote computing resources 110 that make up part or all of an electronic-commerce shopping environment. In other implementations, the user interface may provide a direct communication between a user and an agent.

The remote computing resources 110 may form a portion of a network-accessible computing platform implemented as a computing infrastructure of processors, storage, software, data access, and other components that is maintained and accessible via a network. Services, such as e-commerce shopping services, offered by the remote computing resources 110 do not require that the user have knowledge of the physical location and configuration of the system that delivers the services. The electronic device 106 may communicatively couple to the remote computing resources 110 via the network which may represent wired technologies (e.g., wires, USB, fiber optic cable, etc.), wireless technologies (e.g., RF, cellular, satellite, Bluetooth, etc.), and/or other connection technologies. The network carries data between the electronic device 106 and the remote computing resources 110.

After receiving from a user 104 an order for an item that may be transported by a UAV 112 from an AFC 102 and delivered to a user specified delivery location, the electronic device 106 may send this information to the remote computing resources 110 over the network. As illustrated, the remote computing resources 110 may include one or more servers, such as servers 120(1), 120(2), . . . , 120(N). These servers 120(1)-(N) may be arranged in any number of ways, such as server farms, stacks, and the like that are commonly used in data centers. Furthermore, the servers 120(1)-(N) may include one or more processors 122 and memory 124 that may store an inventory management system 126.

The inventory management system 126 may be configured, for example, to perform order planning and filling of materials handling facility 130, to perform order planning, replenishment for AFCs 102 and/or to perform order planning and fulfillment of orders by UAVs 112 and/or by traditional delivery mechanism (e.g., vehicles). In various implementations, one or more AFCs 102 may be configured to generally perform some or all of the functions that are traditionally done by a ground-based materials handling facility 130, except they are airborne.

A shuttle 150 may be used to replenish the AFC 102. For example, as UAVs 112 are deployed from an AFC 102 to deliver ordered items to a user 104, the AFC is depleted of both inventory and UAVs. The inventory management system 126 may instruct UAVs, after completing a delivery, to navigate to a shuttle positioned at a replenishment area. The shuttles 150 may be loaded with UAVs, inventory, workers, materials handling equipment, and/or other inbound items and navigate to the AFC 102 to replenish the AFC 102. Likewise, a shuttle, after offloading the inbound items at the AFC 102, may receive outbound items (e.g., overstocked items, transshipment items, workers, materials handling equipment, waste) from the AFC 102 and transport those items back to a ground based materials handling facility 130 and/or to another location.

The AFC 102, UAVs 112 and/or the shuttles 150 may communicatively couple to the remote computing resources 110 via a network. For example, the communications to and from the AFC 102, shuttles 150 and/or UAVs 112 may utilize wireless antennas of the AFC 102, shuttles 150 and/or UAVs 112.

In various implementations, the inventory management system 126 and/or AFC 102 may send instructions to or otherwise control the UAVs 112 for delivering items, navigating to shuttles, navigating to materials handling facilities 130, and the like. As discussed further below with respect to FIGS. 2-3, UAVs 112 that are operating at lower altitudes may form a UAV network 200, alone or in combination with the inventory management system 126, landed shuttles 150 and/or ground based materials handling facilities 130. In some implementations, the UAV network 200 may also include the AFC 102, airborne shuttles 150 and/or UAVs descending from higher altitudes.

In various implementations, the remote computing resources 110 and/or inventory management system 126 may also receive tracking data (e.g., GPS) regarding the coordinates of the UAVs 112, shuttles 150 and/or AFCs 102. The GPS data may be utilized for various purposes, such as answering location status requests or for sending notifications regarding the current locations of the AFCs and/or UAVs. For example, a user may request that a notification be sent when an UAV 112 with an item ordered by the user has departed the AFC and/or is approaching. As another example, a notification may be sent to a UAV that has completed an item delivery identifying a location of a shuttle 150 to which the UAV 112 is to navigate. Notifications may also be sent from the AFC 102, shuttles 150 and/or UAVs 112 to the remote computing resources 110 and/or inventory management system 126 regarding various events (e.g., when a UAV has been deployed from an AFC, when a shuttle has reached capacity, when an AFC is running low on inventory and/or UAVs).

Figure 2:
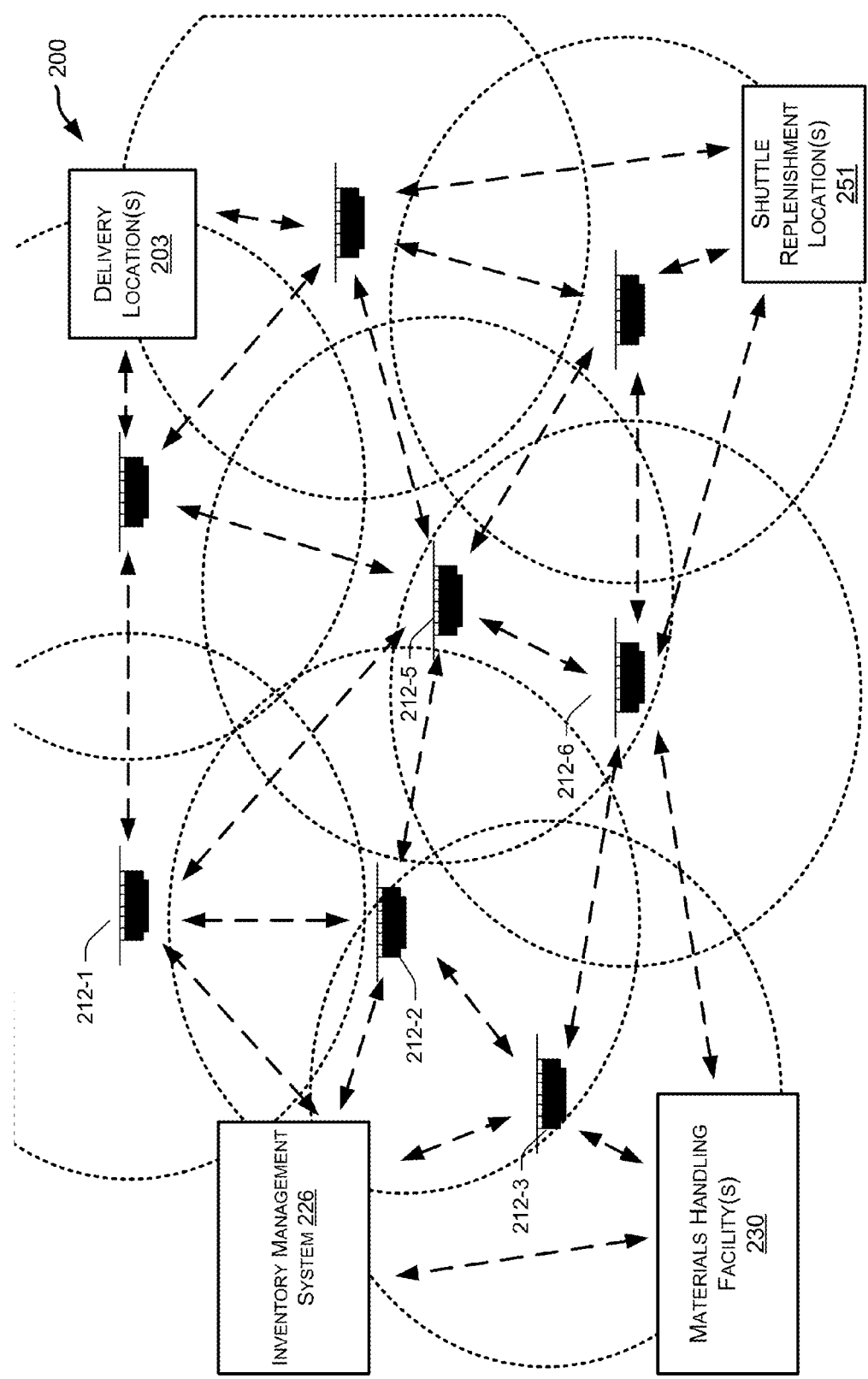
FIG. 2 is a diagram of an unmanned aerial vehicle network, according to an implementation.

FIG. 2 depicts a block diagram of a UAV network 200 that includes UAVs 212, delivery locations 203, shuttle replenishment locations 251, materials handling facilities 230 and an inventory management system 226, according to an implementation.

Each of the UAVs 212, delivery locations 203, shuttle replenishment locations 251, materials handling facilities 230 and/or inventory management system 226 may be configured to communicate with one another. For example, the UAVs 212 may be configured to form a wireless network 200 that utilizes Wi-Fi or another wireless means of communication, each UAV communicating with other UAVs within wireless range. In other implementations, the UAVs 212, inventory management system 226, materials handling facilities 230, shuttle replenishment locations 251 and/or the delivery locations 203 may utilize existing wireless networks (e.g., cellular, Wi-Fi, satellite) to facilitate communication. In some implementations, one or more of the inventory management system 226, materials handling facilities 230, delivery locations 203 and/or shuttle replenishment locations 251 may also communicate with each other via another network (wired and/or wireless), such as the Internet. Likewise, a shuttle (not shown) and/or an AFC (not shown) may communicate with and/or be part of the wireless network 200.

As discussed above, the inventory management system 226 may be configured to communicate with the delivery locations 203, UAVs 212, materials handling facilities 230, AFCs, shuttles, and/or shuttle replenishment locations 251. As an example, position information for each UAV 212 may be determined and shared among UAVs. Each UAV may periodically transmit, for example, ADS-B information to other UAVs in the network. When information, such as ADS-B information, is sent to or from a UAV, the information may include an identifier for the UAV and each UAV may act as a node within the network, forwarding the information until it is received by the intended UAV. For example, the inventory management system 226 may send a message to UAV 212-6 by transmitting the information and the identifier of the intended receiving UAV to one or more of UAVs 212-1, 212-2, 212-3 that are in wireless communication with the inventory management system 226. Each receiving UAV will process the identifier to determine if it is the intended recipient and then forward the information to one or more other UAVs that are in communication with the UAV. For example, UAV 212-2 may forward the message and the identification of the intended receiving UAV to UAV 212-1, 212-3 and 212-5. In such an example, because UAVs 212-1, 212-3 have already received and forwarded the message, it may discard the message without forwarding it again, thereby reducing load on the network 200. The other UAVs, upon receiving the message, may determine that they are not the intended recipient and forward it on to other nodes. This process may continue until the message reaches the intended recipient.

In some implementations, if a UAV loses communication with other UAVs via the wireless network 200, it may activate another wireless communication path to regain connection. For example, if a UAV 212 cannot communicate with any other UAVs via the network 200, it may activate a cellular and/or satellite communication path to obtain communication information from the inventory management system 226, materials handling facility 230, shuttle replenishment location 251 and/or a delivery location 203. If the UAV still cannot regain communication and/or if it does not include an alternative communication component, it may automatically and autonomously navigate toward a designated location (e.g., a nearby materials handling facility 230, shuttle replenishment location 251 and/or delivery location 203).

The wireless mesh network 200 may be used to provide communication between UAVs (e.g., to share weather information including wind speeds and directions, location information, routing information, landing areas), the inventory management system 226, materials handling facilities 230, delivery locations 203 and/or shuttle replenishment locations 251.

In addition, in some implementations, the wireless network 200 may be used to deliver content and/or other information to other computing resources, such as personal computers, electronic book reading devices, audio players, mobile telephones, tablets, desktops, laptops, etc. For example, the mesh network may be used to deliver electronic book content to electronic book reading devices of users.

Figure 3:
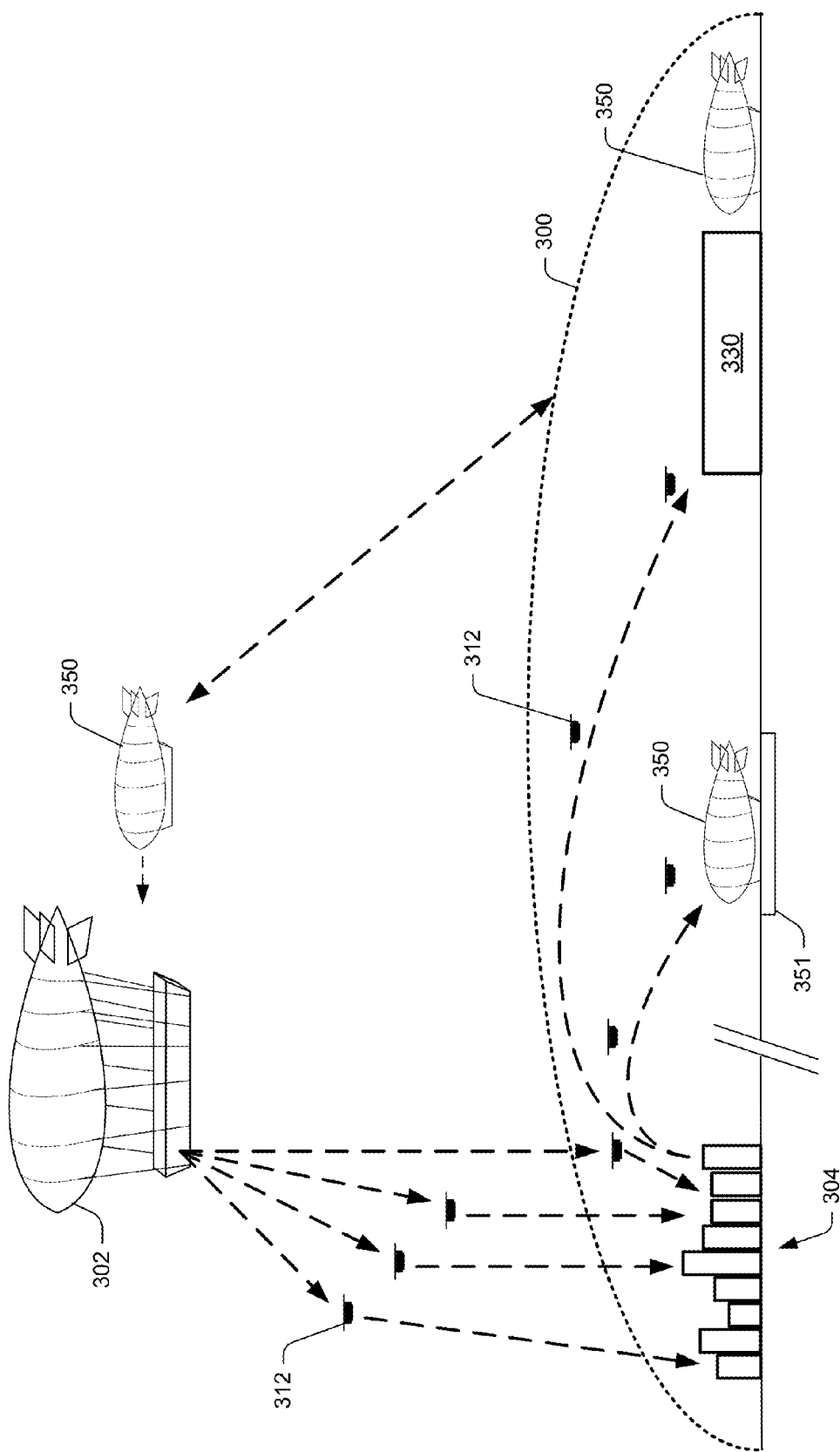
FIG. 3 is a diagram illustrating an unmanned aerial vehicle delivery process that utilizes an airborne fulfillment center, according to an implementation.
Figure 7:
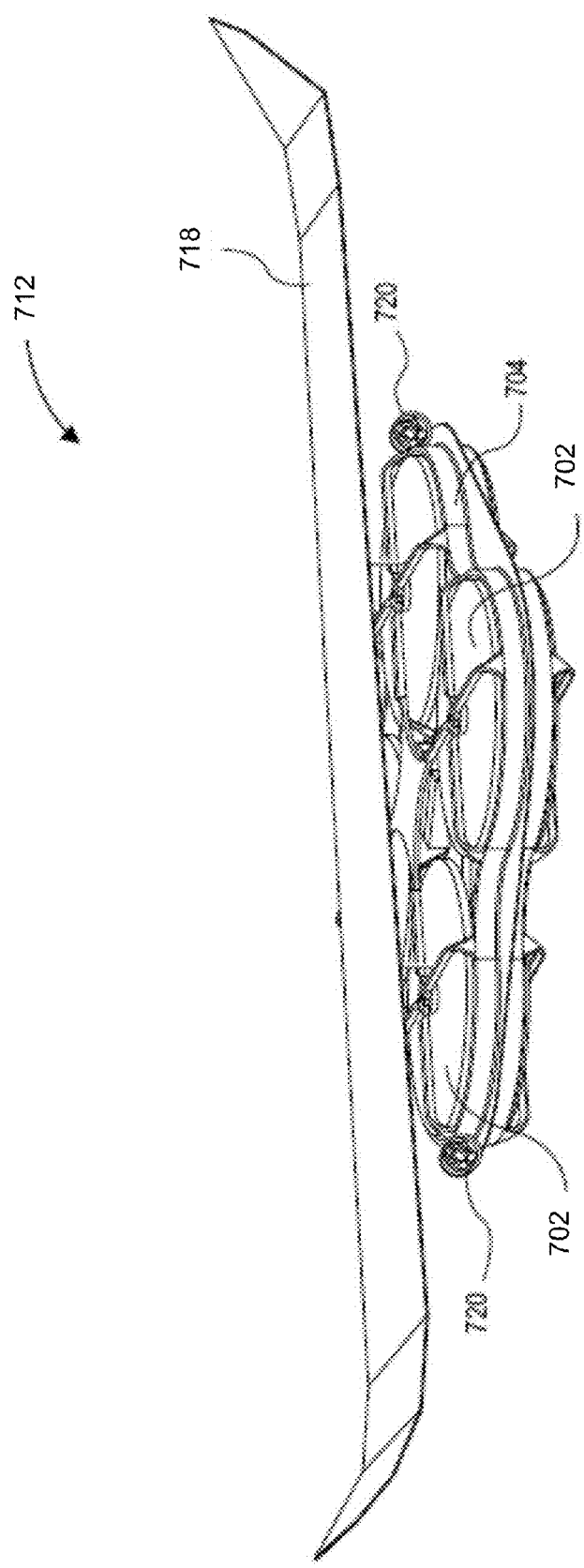
FIG. 7 is another illustration of an unmanned aerial vehicle, according to an implementation.

FIG. 3 is a block diagram illustrating an unmanned aerial vehicle delivery process that utilizes an airborne fulfillment center 302, according to an implementation. As illustrated, an AFC 302 may be positioned above a metropolitan area 304 at a high altitude (referred to herein as a fulfillment center altitude). For example, the AFC 302 may be positioned at an altitude of 45,000 feet or more above the metropolitan area 304. Positioning the AFCs 302 at an altitude above 45,000 takes them out of the flight path of commercial airplanes, which generally have a maximum usable altitude of approximately 42,000 feet. Because the AFCs 302 are not in the flight path of other aerial vehicles, they can remain at a position for extended periods of time without disrupting other aerial systems. Likewise, by placing the AFC 302 at a fulfillment center altitude, the area that can be serviced by UAVs 312 deployed from the AFC 302 to deliver items is increased. For example, UAVs deployed from the AFC 302 may travel horizontally as they descend, thereby expanding the coverage area of the AFC 302. In some implementations, the UAVs 312 may include a wing or other airfoil, as illustrated in FIG. 7, thereby further extending their ability to travel horizontally during descent without requiring much or any power consumption.

As orders are placed by users in the metropolitan area 304 for items that are included in the inventory of the AFC 302, the item is engaged by a UAV 312 and the UAV 312 is deployed from the AFC 302. As the UAV 312 descends, it may navigate toward the user specified delivery location using wings and/or propellers of the UAV 312. For example, if the UAV 312 includes a wing, it may glide down from the AFC 302 and navigate toward the delivery location using the ailerons of the wing to control the direction of the descent. Likewise, the propellers of the UAV may be allowed to freely rotate from the forces of wind passing over the propellers during the descent. The rotation of the propellers may act as generators to provide any additional charging needed for the power modules of the UAV 312.

If the UAV 312 does not include a wing, such as the UAV discussed below with respect to FIG. 6, it may still navigate horizontally by engaging and/or disengaging different motors and corresponding propellers of the UAV 312 to control the direction and speed of the descent of the UAV 312.

As a result of the guided descent, and potential power generation, the UAV 312 can travel a large distance and be near the delivery location before it must use the motors and propellers to maintain flight, thereby conserving power over the duration of the delivery.

As the UAV 312 enters the UAV network 300, the UAV 312 communicates with other UAVs 312. Likewise, the UAV 312 may engage the motors and corresponding propellers to slow the descent of the UAV 312 and complete the navigation of the UAV 312 to the user specified delivery location within the metropolitan area 304 and deliver the item.

Upon completion of item delivery, the UAV 312 may navigate to a shuttle replenishment location 351 that includes a shuttle 350, to a materials handling facility 330, which may also include a shuttle replenishment location, and/or to another location. UAVs 312 deployed from an AFC 302 may be instructed to return to the AFC 302 via a shuttle or may be incorporated into the UAV network 300 to deliver items from a materials handling facility or other location. Likewise, UAVs 312 that are part of the UAV network 300 may be instructed to load onto a shuttle 350 and be provided to the AFC 302 for deployment.

As illustrated, one or more shuttles 350 may be used to replenish the AFC 302, thereby extending the duration of flight of the AFC 302. For example, shuttles 350 may deliver inbound items, discussed below, to the AFC 302. Like the AFCs 302, the shuttles 350 may be airships and may ascend from earth and navigate to and dock with the AFC 302 without consuming large amounts of power. The shuttles 350 may be smaller than the AFC 302 and configured to make multiple trips to and from the AFC 302 providing inbound items to the AFC and retrieving outbound items from the AFC 302.

In some implementations, multiple AFCs 302 may be positioned at altitudes to provide coverage for a larger area. Shuttles within the larger area may provide inbound items to any of the AFCs 302, retrieve outbound items from the AFCs 302 and/or navigate between the AFCs 302. Accordingly, some shuttles 350 may be used to provide inbound items and/or retrieve outbound items from multiple AFCs 302 and/or to provide items between AFCs. In some implementations, shuttles may navigate between AFCs, transshipping items, without returning to earth. In such an implementation, the shuttle 350 may receive fuel and/or service while docked at one of the AFCs 302.

In operation, when an order for one or more items is placed by a user, the order is assigned for fulfillment. The inventory management system may determine if there is an AFC 302 within a delivery range of the user specified delivery location for the order and whether that AFC includes the ordered items. If an AFC is within range and has the inventory, the order may be associated with the AFC for delivery. If the inventory is not available at an AFC within range of the delivery location, the item may be transported to an AFC for delivery or delivered directly from a ground-based materials handling facility.

In some implementations, the AFC 302 may navigate to a lower altitude (e.g., 2,000 feet above the metropolitan area 304) to provide advertising, decrease the delivery time and/or to satisfy an expected demand (e.g., at a temporal event). For example, the exterior of the AFC 302 may include one or more output devices (e.g., visual, audible) that can be used to present advertising or other information about items and/or services. For example, if 100 units of Item A are offered for sale for delivery from the AFC 302, the AFC 302 may navigate to a lower altitude (referred to herein as an advertising altitude) and present an advertisement regarding the sale and the number of units remaining. A user may place an order for the item (Item A), the item is picked from inventory, engaged by a UAV 312 and deployed for delivery. In some implementations, to further increase the speed at which items are delivered as part of a sale, the quantity offered for sale may be pre-engaged by UAVs and as soon as the item is ordered, a UAV with the item may be deployed for delivery.

Once an item is ordered and delivery is initiated, the output device of the AFC may be updated to illustrate a decrement in item count for items remaining to be sold at the advertised sale price. At the advertising altitude, the user may be able to see the UAV as it is deployed and as it delivers the item to the designated location. In some implementations, the UAV may include a flashing light, smoke or other visual identifier to aid in the identification of the UAV by the user as the item is delivered.

As another example, the AFC 302 may navigate to an advertising altitude so that an expected demand or a known demand for a product can be satisfied. For example, if an event is scheduled to occur at a stadium (temporal event), the items likely to be ordered are determined and stocked in the inventory of the AFC 302. In advance of the event, the AFC 302 may navigate to a position near the event and advertise the stocked inventory items for delivery using a UAV that is deployed from the AFC 302. Ordered items can be delivered from the AFC 302 in minutes.

As still another example, ordered items (e.g., pre-release items) may be stocked in the AFC 302 and the AFC may navigate to an area that has a high demand for the items and provide delivery of those items to the customers that ordered the items when the items are released.

Figure 4:
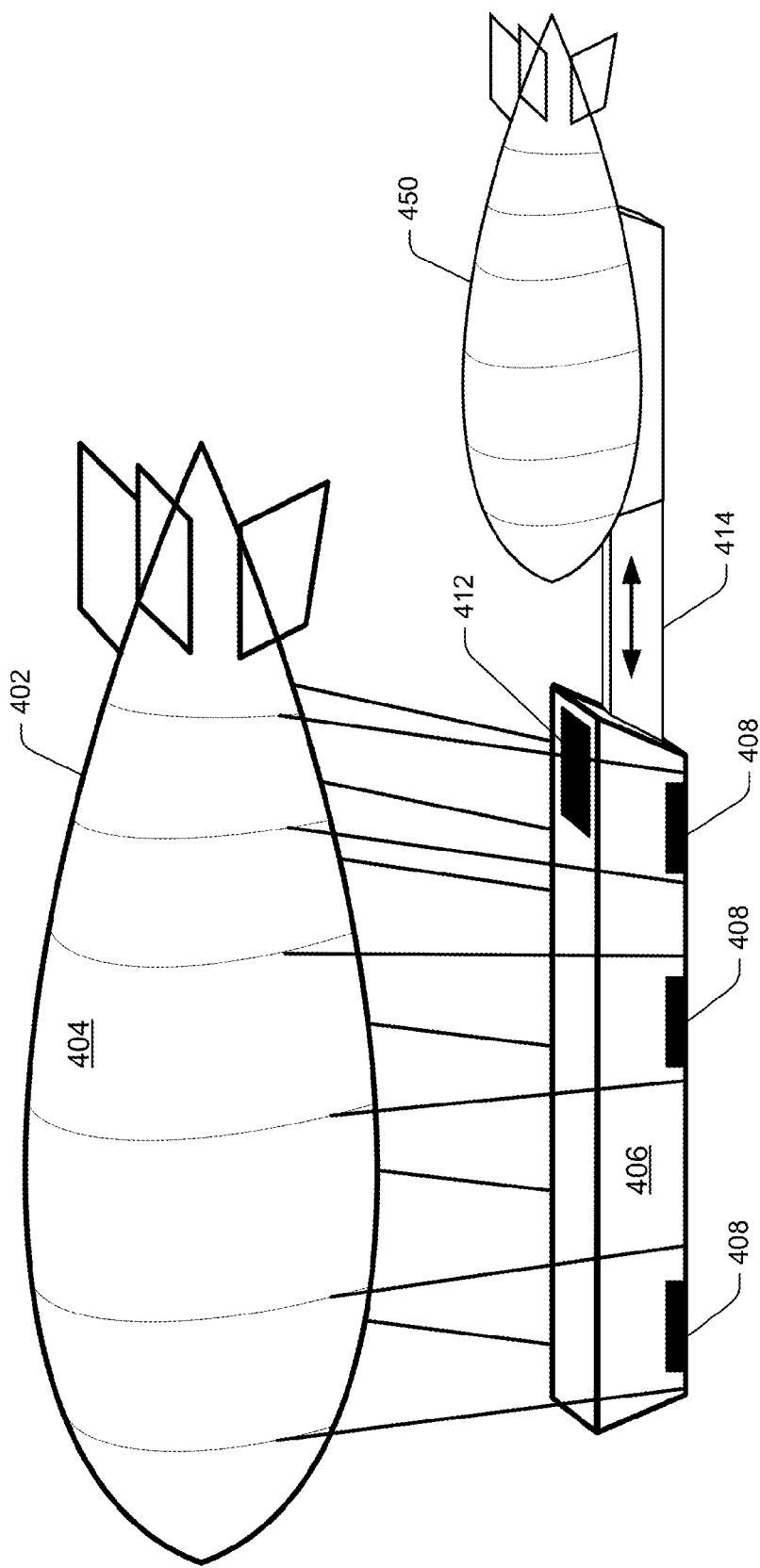
FIG. 4 is an illustration of an airborne fulfillment center and a shuttle docked with the airborne fulfillment center, according to an implementation.

FIG. 4 is an illustration of an AFC 402 and a shuttle 450 docked with the AFC 402, according to an implementation. As illustrated, the AFC 402 may be configured as an airship. An airship is a type of aerostat or lighter-than-air aircraft that can navigate through the air under its own power. The AFC 402 includes a lifting portion 404, which includes the lighter than air gas, and a fulfillment center 406 which is used to store inventory, deploy UAVS, etc. The fulfillment center may be coupled with the lifting portion using a variety of techniques. For example, as illustrated, the fulfillment center 406 may be suspended using cables from the lifting portion 404 of the AFC 402. In other implementations, the fulfillment center 406 may be directly mounted to or incorporated with the lifting portion 404.

The fulfillment center 406 of the AFC 402 may include one or more UAV deployment bays 408 and one or more docking bays 412 or docking arms 414. Depending on the configuration of the shuttle 450 and/or the AFC 402, the docking bay 412 and/or docking arm 414 may be utilized. For example, as illustrated, the docking arm 414 has been extended from the AFC 402 and docked or mated to the shuttle 450 to facilitate the transfer of inbound items and outbound items between the AFC 402 and the shuttle 450. As another example, if the lifting portion of the AFC 402 has a toroid shape, the shuttle 450 may navigate through the opening of the toroid and dock with the top of the fulfillment center 406 of the AFC 402.

The airship that is utilized for the AFC 402 may be any type of airship. For example, the airship may be a non-rigid airship, a semi-rigid airship, or a rigid airship. Likewise, the AFC 402 may be of any size, shape and/or configuration. In some implementations, the AFC may be hundreds of feet long and capable of carrying several hundreds of tons. In other implementations, the airship may have the shape of a toroid, a tubular shape, a spherical shape, include multiple portions, etc.

The control of the AFC 402 may be manual (e.g., a pilot) or automated (e.g., directly or remotely controlled by an automated system, robotic, etc.). The AFC 402 may likewise include one or more internal computing systems (not shown), that are capable of maintaining system information for the AFC 402 and/or providing other computing functions. For example, the internal computing system may include an inventory component that maintains current inventory level information, where inventory is located in the AFC, and the like. The AFC 402 may be configured to obtain information from a remote computing resource and/or the inventory management system.

Likewise, the fulfillment center 406 of the AFC may be operated by human workers, automated with robotic equipment, such as Kiva System® mobile drive units, or a combination thereof. When the AFC is occupied by humans, it may be pressurized and temperature controlled. Likewise, radiation shielding may be utilized to protect workers from exposure due to the location of the AFC.

The fulfillment center 406 may utilize any variety of materials handling equipment. Materials handling equipment includes, but is not limited to mobile drive units, forklifts, shelving, bins, totes, carts, boxes, trolleys, containers, tape, labels, printers, packing supplies, and the like.

Figure 5:
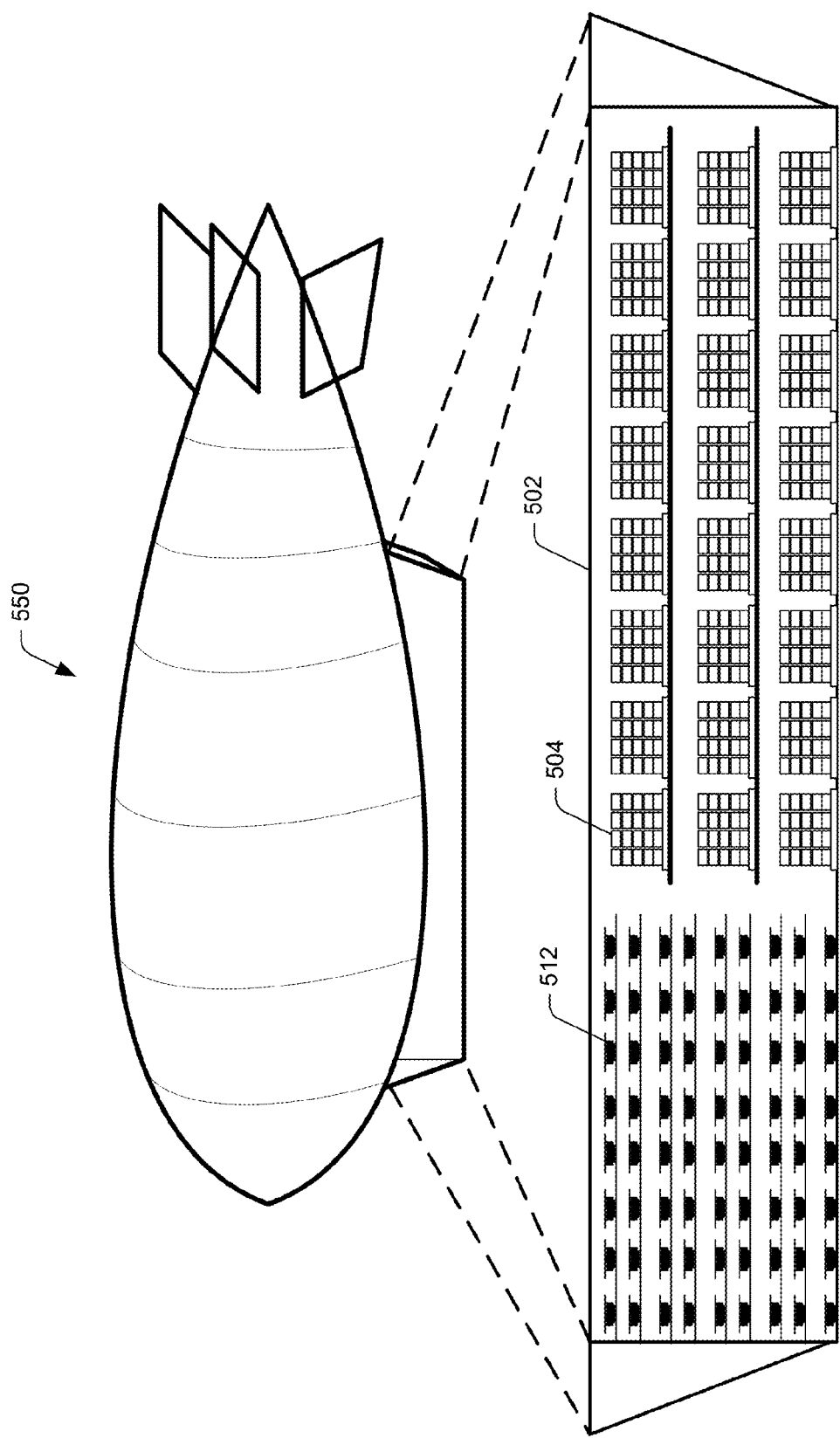
FIG. 5 is an illustration of a shuttle, according to an implementation.

FIG. 5 is an illustration of a replenishment shuttle 550, according to an implementation. As illustrated, the shuttle 550, like the AFC 402 (FIG. 4), may be configured as an airship. The airship that is utilized for the shuttle 550 may be any type of airship. For example, the airship may be a non-rigid airship, a semi-rigid airship, or a rigid airship. Likewise, the shuttle 550 may be of any size and/or configuration. In some implementations, the shuttle 550 may be one hundred feet long.

The control of the shuttle 550 may be manual (e.g., a pilot) or automated (e.g., directly or remotely controlled by an automated system, robotic, etc.). The shuttle 550 may likewise include one or more internal computing systems (not shown), that are capable of maintaining system information for the shuttle 550 and/or providing other computing functions.

As illustrated in the expanded view 502, the shuttle 550 may be configured to transport inbound items to an AFC. Inbound items may be any items that are to be delivered to an AFC. For example, inbound items may include UAVs 512, inventory 504, workers, supplies, fuel, materials handling equipment, etc. Different types of inbound items may be transported on the same or different shuttles 550. For example, the shuttle 550 illustrates that both inventory items 504 and UAVs 512 may be transported by the shuttle 550 to an AFC. In some implementations, the shuttle 550 may be configured to provide charging to the UAVs 512 as they are being transported to the AFC so the UAVs 512 are at or near a full charge and ready for deployment when the UAVs arrive at the AFC.

In some implementations, one or more of the UAVs 512 may be positioned on an external portion of the shuttle 550 and be pre-loaded with inventory (such as high volume inventory, or currently ordered inventory). If an order of an item that is pre-loaded on a UAV positioned on an external portion of the shuttle 550 is received, the UAV may be deployed from the shuttle 550 as the shuttle is in transit to or from the AFC. Likewise, if a UAV positioned on the outside of the shuttle 550 is carrying an item that has already been ordered, the UAV may deploy from the shuttle 550 once the shuttle reaches an altitude that allows the UAV to navigate to the delivery location for the ordered item using reduced or no power.

The shuttle may also be used for advertising. For example, as the shuttle is navigating to or from an AFC, the shuttle may present advertisements using an output device (e.g., display, audio, etc.) of the shuttle. The advertisement may be for an item available for delivery from the AFC, an item available for immediate delivery by a UAV mounted to the shuttle, an advertisement for a service, etc.

Inventory items that are transported by a shuttle to an AFC may include items corresponding to an existing user order, high-volume items, release day items, sale items, and/or other items expected to be in demand within a delivery range of the AFC. A high-volume item may be, for example, an item that is frequently ordered, such as a popular book, shoe, video game, tablet, etc. A release day item may be an item that will become available for delivery on the day it is released to the public (e.g., book, movie, game, toy, etc.).

In addition to providing inbound items to an AFC, the shuttle may receive outbound items from the AFC. Outbound items include any items that are to be removed from the AFC. For example, outbound items may include overstock items, transshipment items, waste, damaged items, workers, etc. In some implementations, one or more UAVs may also be utilized to transport outbound items from an AFC.

While the examples discussed herein describe an AFC and a shuttle that are configured to include an airship, it will be appreciated that other types of aerial vehicles may be utilized, for either or both of the AFC and/or the shuttle, with the implementations described herein.

Figure 6:
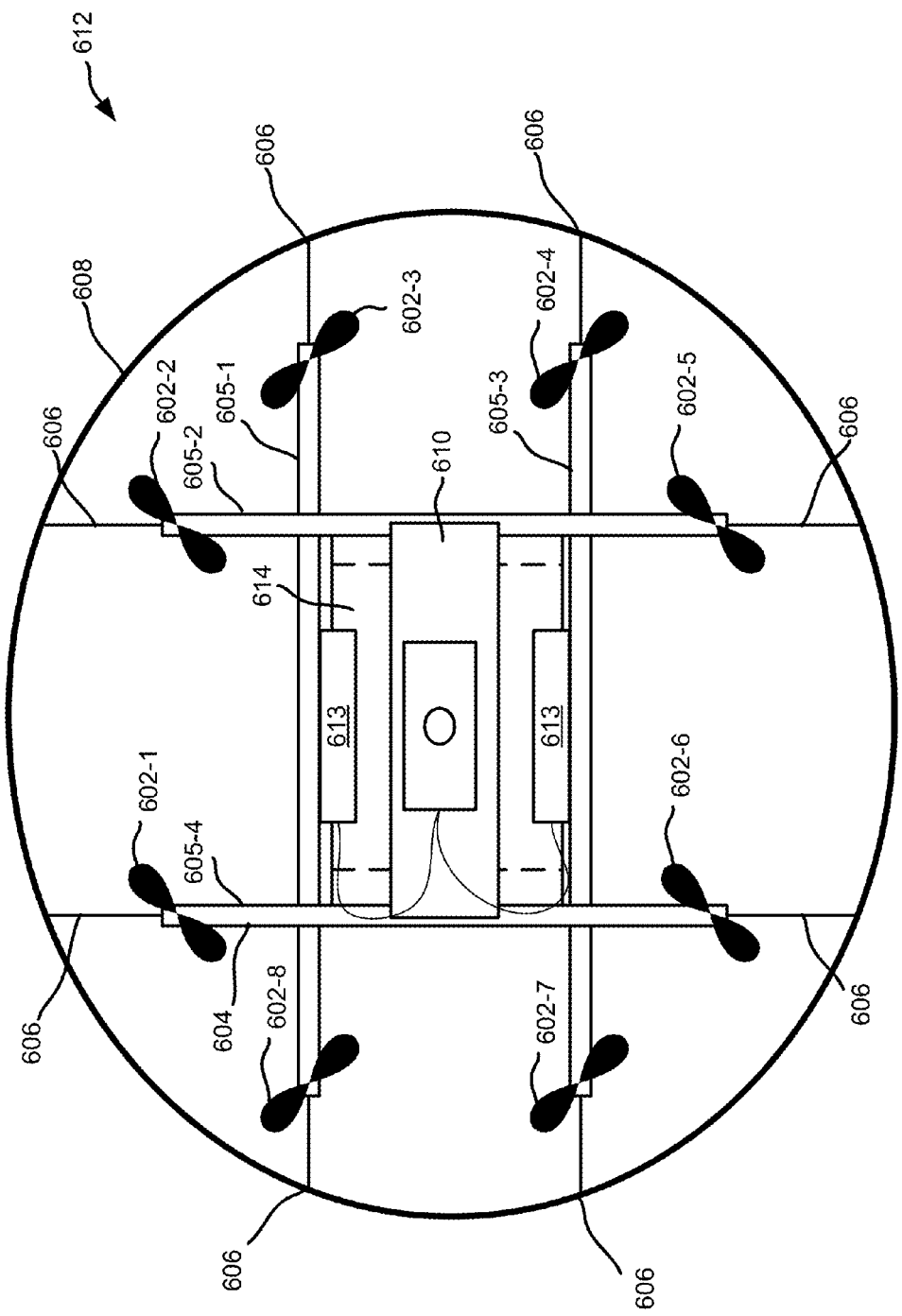
FIG. 6 is an illustration of a top-down view of an unmanned aerial vehicle, according to an implementation.

FIG. 6 illustrates a block diagram of a top-down view of a UAV 612 according to an implementation. As illustrated, the UAV 612 includes eight lifting propellers 602-1, 602-2, 602-3, 602-4, 602-5, 602-6, 602-7, 602-8 spaced about the frame 604 of the UAV. The lifting propellers 602 may be any form of propeller (e.g., graphite, carbon fiber) and of a size sufficient to lift the UAV 612 and any item engaged by the UAV 612 so that the UAV 612 can navigate through the air, for example, to deliver an item. While this example includes eight lifting propellers, in other implementations, more or fewer propellers may be utilized. Likewise, in some implementations, the lifting propellers may be positioned at different locations on the UAV 612. In addition, alternative methods of propulsion may be utilized. For example, fans, jets, turbojets, turbo fans, jet engines, and the like may be used to propel the UAV.

The frame 604 or body of the UAV 612 may likewise be of any suitable material, such as graphite, carbon fiber, and/or aluminum. In this example, the frame 604 of the UAV 612 includes four rigid members 605-1, 605-2, 605-3, 605-4, or beams arranged in a hash pattern with the rigid members intersecting and joined at approximately perpendicular angles. In this example, rigid members 605-1 and 605-3 are arranged parallel to one another and are approximately the same length. Rigid members 605-2 and 605-4 are arranged parallel to one another, yet perpendicular to rigid members 605-1 and 605-3. Rigid members 605-2 and 605-4 are approximately the same length. In some embodiments, all of the rigid members 605 may be of approximately the same length, while in other implementations some or all of the rigid members may be of different lengths. Likewise, the spacing between the two sets of rigid members may be approximately the same or different.

While the implementation illustrated in FIG. 6 includes four rigid members 605 that are joined to form the frame 604, in other implementations, there may be fewer or more components to the frame 604. For example, rather than four rigid members, in other implementations, the frame 604 of the UAV 612 may be configured to include six rigid members. In such an example, two of the rigid members 605-2, 605-4 may be positioned parallel to one another. Rigid members 605-1, 605-3 and two additional rigid members on either side of rigid members 605-1, 605-3 may all be positioned parallel to one another and perpendicular to rigid members 605-2, 605-4. With additional rigid members, additional cavities with rigid members on all four sides may be formed by the frame 604. As discussed further below, a cavity within the frame 604 may be configured to include an item engagement mechanism for the engagement, transport, and delivery of item(s) and/or containers that contain item (s).

In some implementations, the UAV may be configured for aerodynamics. For example, an aerodynamic housing may be included on the UAV that encloses the UAV control system 610, one or more of the rigid members 605, the frame 604, and/or other components of the UAV 612. The housing may be made of any suitable material(s) such as graphite, carbon fiber, aluminum, etc. Likewise, in some implementations, the location and/or the shape of the item engagement mechanism and/or any items or containers may be aerodynamically designed.

In some instances, a container may be utilized for holding an item, wherein the item engagement mechanism engages the item by engaging the container. For example, specially shaped containers for use with the UAV 612 may be aerodynamically designed and provided in the AFC, such that a worker or automated system is able to select one of the containers and place the item in the container for engagement by the UAV 612.

The containers may be configured to account for the change in pressure as the UAV descends from the AFC. For example, the container may be a rigid body with one or more openings or baffles that allow pressure to equalize between the interior of the container and the atmosphere around the container. Likewise, the containers may have thermal characteristics to keep items within the containers at a desired temperature. For example, if prepared hot food is being delivered, the container may be designed to keep the food at a desired temperature until the food is delivered to the user.

In some implementations, the item engagement mechanism may be configured such that, when an item and/or container is engaged, it is enclosed within the frame and/or housing of the UAV 612 so that no additional drag is created during transport of the item. In other implementations, the item and/or container may be shaped to reduce drag and provide a more aerodynamic design. For example, if a portion of a container extends below the UAV when engaged, the exposed portion of the container may have a curved shape.

The lifting propellers 602 and corresponding lifting motors are positioned at both ends of each rigid member 605. The lifting motors may be any form of motor capable of generating enough speed with the lifting propellers to lift the UAV 612 and any engaged item thereby enabling aerial transport of the item. For example, the lifting motors may each be a FX-4006-13 740kv multi rotor motor.

Extending outward from each rigid member is a support arm 606 that is connected to a safety barrier 608. In this example, the safety barrier is positioned around and attached to the UAV 612 in such a manner that the motors and propellers 602 are within the perimeter of the safety barrier 608. The safety barrier may be plastic, rubber, etc. Likewise, depending on the length of the support arms 606 and/or the length, number or positioning of the rigid members 605, the safety barrier may be round, oval, or any other shape.

Mounted to the frame 604 is the UAV control system 610. In this example, the UAV control system 610 is mounted in the middle and on top of the frame 604. The UAV control system 610, as discussed in further detail below with respect to FIG. 12, controls the operation, routing, navigation, communication, and the item engagement mechanism of the UAV 612.

The UAV 612 also includes one or more power modules 613. In this example, the UAV 612 includes two power modules 613 that are removably mounted to the frame 604. The power module for the UAV may be in the form of battery power, solar power, gas power, super capacitor, fuel cell, alternative power generation source, or a combination thereof. For example, the power modules 613 may each be a 6000 mAh lithium-ion polymer battery, polymer lithium ion (Li-poly, Li-Pol, LiPo, LIP, PLI, or Lip) battery. The power module(s) 613 are coupled to and provide power for the UAV control system 610 and the propeller motors. In some implementations, one or more of the power modules may be configured such that it can be autonomously removed and/or replaced with another power module while the UAV is landed (e.g., such power modules may be provided or replaced while the UAV is landed in a shuttle). In some implementations, when the UAV is within a shuttle or mounted to an exterior of a shuttle, the UAV may engage with a charging member to recharge the power module. In some implementations, when the UAV is descending from the AFC, it may utilize the propellers and corresponding motors as generators to further charge the power modules 613.

As mentioned above, the UAV 612 may also include an item engagement mechanism 614. The item engagement mechanism may be configured to engage and disengage items and/or containers that hold items. In this example, the item engagement mechanism 614 is positioned within a cavity of the frame 604 that is formed by the intersections of the rigid members 605. The item engagement mechanism may be positioned beneath the UAV control system 610. In implementations with additional rigid members, the UAV may include additional item engagement mechanisms and/or the item engagement mechanism 614 may be positioned in a different cavity within the frame 604. The item engagement mechanism 614 may be of any size sufficient to securely engage and disengage items and/or containers that contain items. In other implementations, the engagement mechanism may operate as the container, containing the item(s) to be delivered. The item engagement mechanism communicates with (via wired or wireless communication) and is controlled by the UAV control system 610.

As will be described in more detail below with respect to FIG. 12, the UAV control system 610 may operate in conjunction with or may otherwise utilize or communicate (e.g., via wired and/or wireless communication) with one or more components of the inventory management system 126, shuttles, and/or the AFC. Likewise, components of the inventory management system 126, shuttles, and/or the AFC may generally interact and communicate with the UAV control system 610.

While the implementations of the UAV discussed herein utilize lifting propellers to achieve and maintain flight, in other implementations, the UAV may be configured in other manners. In one implementation, the UAV may include fixed wings and/or a combination of both propellers and fixed wings, as illustrated in FIG. 7.

FIG. 7 depicts another view of a UAV 712, according to an implementation. In the example illustrated in FIG. 7, the UAV 712 includes a wing 718 coupled to the frame 704 of the UAV 712. The wing 718 may be formed of any suitable material such as, but not limited to, carbon fiber, aluminum, fabric, plastic, fiberglass, wood, etc. The wing 718 may be coupled to the top of the frame 704 and positioned above a thrusting motor housing 720 that includes the thrusting motor and thrusting propeller.

The thrusting motor housing 720 may be aerodynamically shaped and configured to encase a thrusting motor and/or a thrusting propeller. The thrusting motor and the thrusting propeller may be the same or different than the lifting motors and lifting propellers 702. For example, in some implementations, the thrusting motor may be a Tiger U-8 motor and the thrusting propeller may have a dimension of eighteen inches. In other implementations, the thrusting motor and thrusting propeller may be formed with the thrusting motor housing 720 as a single unit, such as a ducted fan system. In some implementations, the thrusting propeller may have a smaller dimension than the lifting propellers 702. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the lifting propellers 702 and utilized to increase the efficiency of flight that includes a horizontal component. For example, when the UAV 712 is traveling in a direction that includes a horizontal component, the thrusting motors may be engaged to provide horizontal thrust force via the thrusting propellers to propel the UAV 712 horizontally. As a result, the speed and power utilized by the lifting motors may be reduced. Alternatively, in selected implementations, the thrusting motor may be oriented at an angle greater or less than ninety degrees with respect to the lifting propellers 702 to provide a combination of pushing and lifting thrust.

The wing 718 is designed to have an airfoil shape to provide lift to the UAV 712 as the UAV 712 moves horizontally. In some implementations, utilizing the thrusting motors and the thrusting propellers in conjunction with the wing 718, or just the wing, when the UAV 712 is descending from the AFC, the UAV may travel long horizontal distances (miles) from the AFC using little to no power. In implementations where the wing 718 includes flaps and/or ailerons, the pitch, yaw and roll of the UAV 712 may be controlled using the flaps and/or ailerons alone or in combination with the lifting motors and lifting propellers 702 and/or the thrusting motors and thrusting propellers. If the wing 718 does not include flaps and/or ailerons, the lifting motors and lifting propellers 702 and/or the thrusting motors and thrusting propellers may be utilized to control the pitch, yaw, and/or roll of the UAV 712 during flight. In some implementations, the wing 718 may be configured to rotate or pivot about the frame 704 of the UAV 712 to reduce or increase drag when the UAV 712 is moving in a direction that includes a vertical component.

The UAV 712 may be configured with eight lifting propellers 718 and one or more thrusting motors and thrusting propellers, as shown, or may have a different configuration. In another configuration, the wing may be mounted to a UAV that includes eight lifting motors and corresponding lifting propellers but no thrusting motors or thrusting propellers, such as the UAV 612 (FIG. 6). In still another example, the UAV may have four lifting motors and lifting propellers and one or more thrusting motors and thrusting propellers, in conjunction with a wing 718.

Still further, while the UAV 712 illustrates a single wing 718 extending across the top of the UAV 712, in other implementations, additional wings and/or different configurations of wings may be utilized. For example, in one implementation, a wing may extend horizontally from either side of the UAV 712. In another implementation, a front wing may extend from either side of the front of the UAV 712 and a larger rear wing may extend from either side of the rear of the UAV 712.

Figure 8:
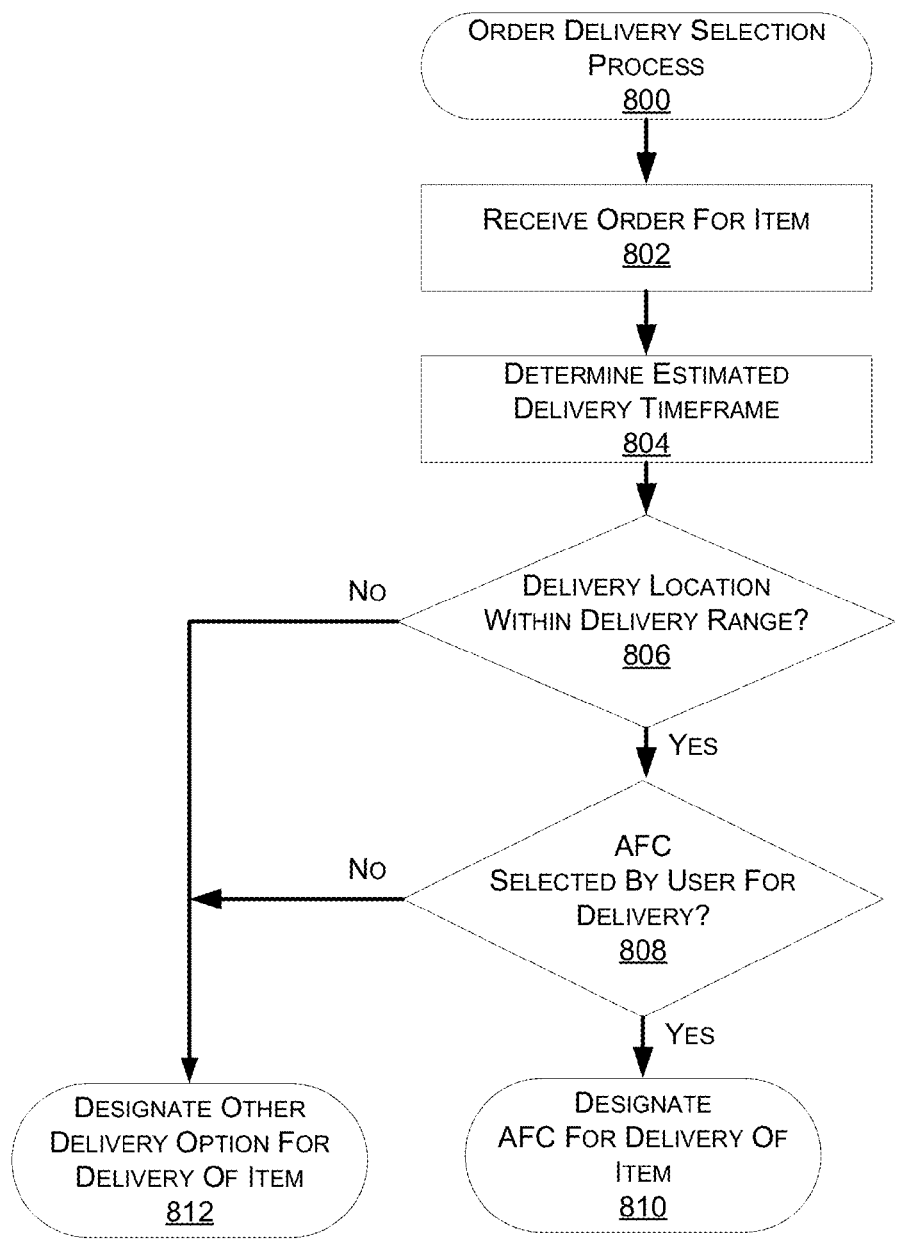
FIG. 8 is a flow diagram of an example order delivery selection process, according to an implementation.

FIG. 8 is a flow diagram illustrating an example order delivery selection process 800, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 800 begins with the receipt of an order for an item, as in 802. Upon receiving an order for an item from a user, a determination is made as to the estimated delivery timeframe for that item, as in 804. In some examples, this may include identifying a materials handling facility and/or AFC with the requested item in stock and estimating the time required to fulfill the item to the user. In other implementations, the estimated delivery timeframe may be a set day from the date of the purchase request or a series of days. For example, a user may specify that the delivery timeframe is to be one day from the date of the purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week. Alternatively, the estimated delivery timeframe may be immediate delivery.

After the estimated delivery timeframe is determined, a determination is made as to whether an AFC is or will be within a delivery area that includes a user specified delivery location, as in 806. As described above, in various implementations, AFCs may be positioned at fulfillment center altitudes and UAVs may be deployed from the AFC to deliver ordered items. Each AFC may have a corresponding delivery range representative of the range or distance a UAV can travel to deliver an item when deployed from the AFC. In some implementations, a delivery location may be within the delivery range of multiple AFCs and/or ground based materials handling facilities.

If it is determined that the delivery location is within the range of one or more AFCs, a determination is made as to whether one of the AFCs is selected by the user for delivery, as in 808. In various implementations, an interaction may be received from a user through a user interface that presents delivery options to the user and receives a selection from the user (e.g., for selecting an AFC or other delivery option). In addition, in various implementations, a user may preselect or provide a preference for deliveries from an AFC or other delivery options.

In various implementations, different factors may be evaluated for determining whether an AFC will be presented as an option for fulfillment of an item. For example, an AFC's current and/or planned inventory, available capacity, ability to handle items of certain sizes, suitability for delivering certain types of items via UAV (e.g., large and/or heavy items), etc., may all be considered. If the user selects an available AFC, the selected AFC is designated for the delivery of the item, as in 810.

If it is determined that an AFC is not selected for delivery, as in 808, or that no AFCs will be within the range of the delivery location, as in 806, another type of delivery option is designated (e.g., as selected by the user) for the item, as in 812. In various implementations, other delivery options may include traditional carrier deliveries, UAV delivery from a materials handling facility, providing an item at a pickup location where a user may retrieve the item, etc.

Figure 9:
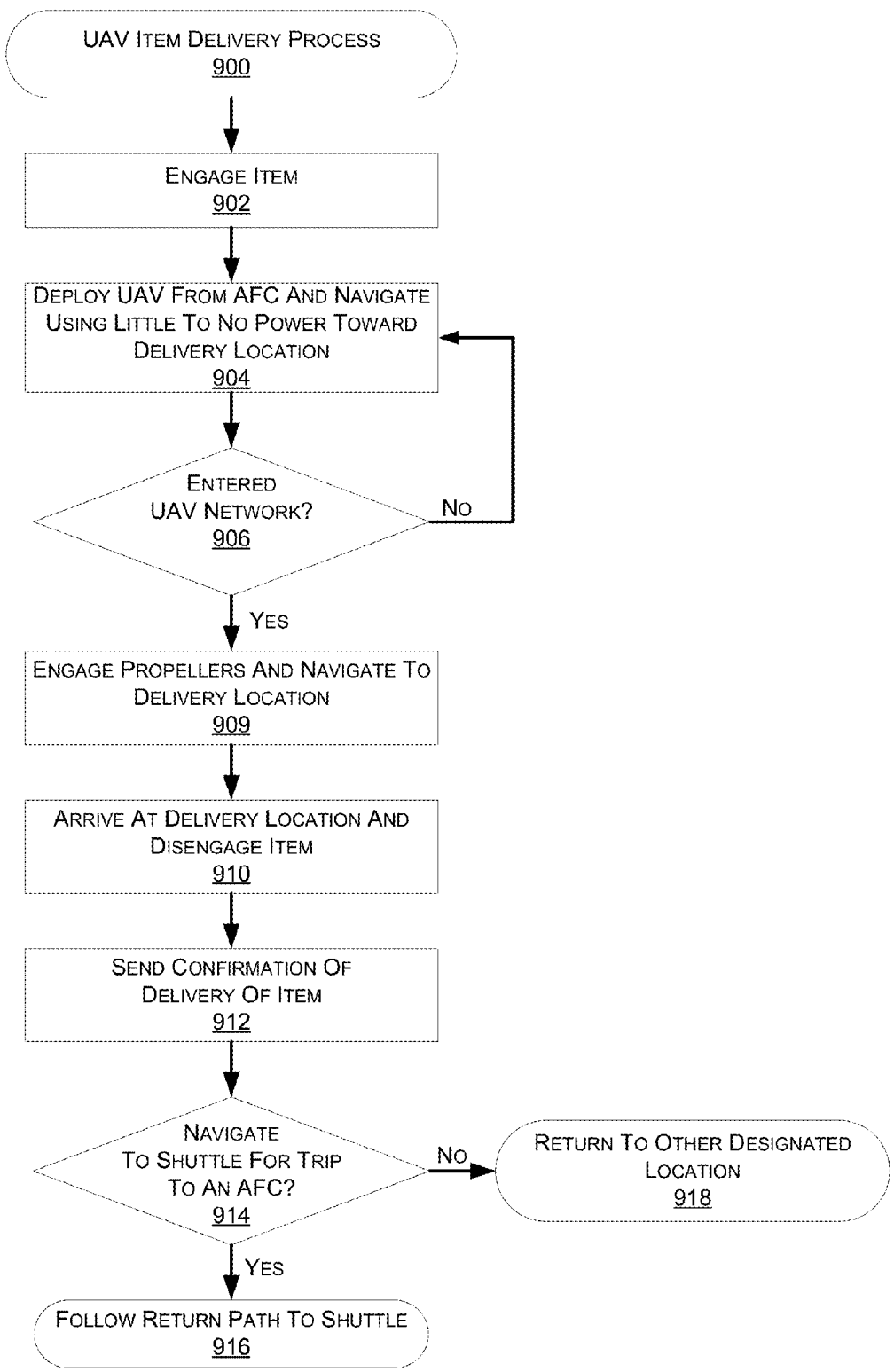
FIG. 9 is a flow diagram of an example unmanned aerial vehicle item delivery process, according to an implementation.

FIG. 9 is a flow diagram illustrating an example process 900 for a delivery of an item by a UAV deployed from an AFC, according to an implementation. The example process 900 begins with the UAV engaging the item, as in 902. In various implementations, different types of UAVs may have different methods for engaging an item. For example, as described above with respect to FIG. 6, a UAV may include an inventory engagement mechanism for engaging an item. Likewise, in some implementations, the item may be engaged by the UAV before it is ordered so that the UAV can be deployed for delivery as soon as the item is ordered.

After the item is engaged, the UAV is deployed or otherwise released from the AFC and the UAV begins navigation along a delivery path toward the specified delivery location using little or no power, as in 904. As discussed above, as the UAV descends from the AFC, it may travel in a path that includes a horizontal component using little to no power by manipulating the ailerons of a wing, if so equipped, and/or by selectively engaging the motors and corresponding propellers of the UAV. In various implementations, delivery path instructions may be received by the UAV (e.g., from the AFC, from the inventory management system, from a remote computing resource, etc.).

In some implementations, the UAV may also navigate to avoid any other aircraft, such as commercial aircraft, private aircraft, and/or other UAVs as it descends from the AFC. For example, the UAV may be provided with flight path information of other aircraft and navigate to avoid intersections with those flight paths. In another example, the UAV may monitor for ADS-B signals to detect and avoid nearby aircraft.

As the UAV descends, a determination is made as to whether the UAV has entered the UAV network, as in 906. It may be determined that the UAV has entered the UAV network when it is able to communicate with other UAVs, join the UAV network discussed above with respect to FIGS. 2 and 3, has reached a defined altitude, etc. If the UAV has not entered the UAV network, the example process 900 returns to block 904 and continues. Once it is determined that the UAV has entered the UAV network, the UAV may engage the motors and corresponding propellers of the UAV to slow descent of the UAV and to complete navigation of the UAV along the delivery path to the delivery location, as in 909.

In some implementations, the UAV may receive additional information (e.g., weather) from UAVs of the UAV network and/or detect obstacles as it navigates toward the delivery location. As it receives information and/or detects obstacles, the UAV may alter the delivery path that is followed to the delivery location. When the UAV arrives at the delivery location, the ordered item is disengaged from the UAV to complete the delivery of the item, as in 910. After the UAV has disengaged the item, a confirmation of the delivery is sent from the UAV, as in 912. In various implementations, the confirmation of the delivery of the item may be received by the AFC, the inventory management system, a remote computing resource, other UAVs, etc., and may be utilized for updating the status in the inventory management system regarding the delivery of the item, planning inventory for the AFC, for providing a notification to a user regarding the delivery, etc.

Once the confirmation of the delivery has been sent, a determination is made as to whether the UAV will navigate to a shuttle for a trip back to the AFC or another AFC, as in 914. If the UAV is to return to the AFC, the UAV receives return path instructions identifying a location of a shuttle replenishment location at which a shuttle is or will be positioned that the UAV may utilize to travel upon back to the AFC. Accordingly, the UAV will navigate along the return path to the shuttle replenishment location and land or otherwise be placed into a shuttle for return to the AFC, as in 916. If the UAV is not to return to the AFC or another AFC, the UAV returns to another designated location, as in 918. For example, the UAV may be instructed to navigate to a ground based materials handling facility within the range of the UAV.

In various implementations, certain portions of the example process 900 may be repeated, in particular with regard to deliveries of multiple items. For example, if a UAV is carrying multiple items that are to be delivered to different delivery locations, the UAV may travel from one delivery location to another before navigating to a shuttle or another designated location.

The UAV item delivery process for delivering items using a UAV deployed from an AFC provides the ability for users to receive items quickly and with limited transportation costs. For example, for items stocked in inventory at the AFC, the user may place an order for an item and have the item delivered within ten minutes or less, in some examples. Likewise, through the use of UAVs, the items can be delivered to virtually any user specified delivery location. For example, a user may select to have the item delivered directly to the location of the user. In such an example, location information may be determined and utilized as the location of the user. For example, the GPS information of the user's portable device may be utilized as the location of the user and the item delivered to a location near the GPS position of the user's portable device. If the user moves to a different location after ordering the item, the position of the user may be updated and the UAV may update its navigation path based on the current location of the user.

Likewise, with the speed of item delivery available from the implementations discussed herein, a large variety of items may be delivered to a user. In one example, the AFC may include a food preparation area and a user may order prepared food (such as a meal). The ordered food may be prepared, placed in a container and delivered directly to the user from the AFC using a UAV. The container may be configured to keep the food at the desired temperature (hot or cold) until delivery. Any other type of item that may be carried by a UAV may likewise be delivered using the implementations discussed herein. In some implementations, the AFC may be utilized to promote or advertise items and/or to fulfill an expected high demand at an area, such as a location of a temporal event (e.g., sporting event, concert, or other gathering).

Figure 10:
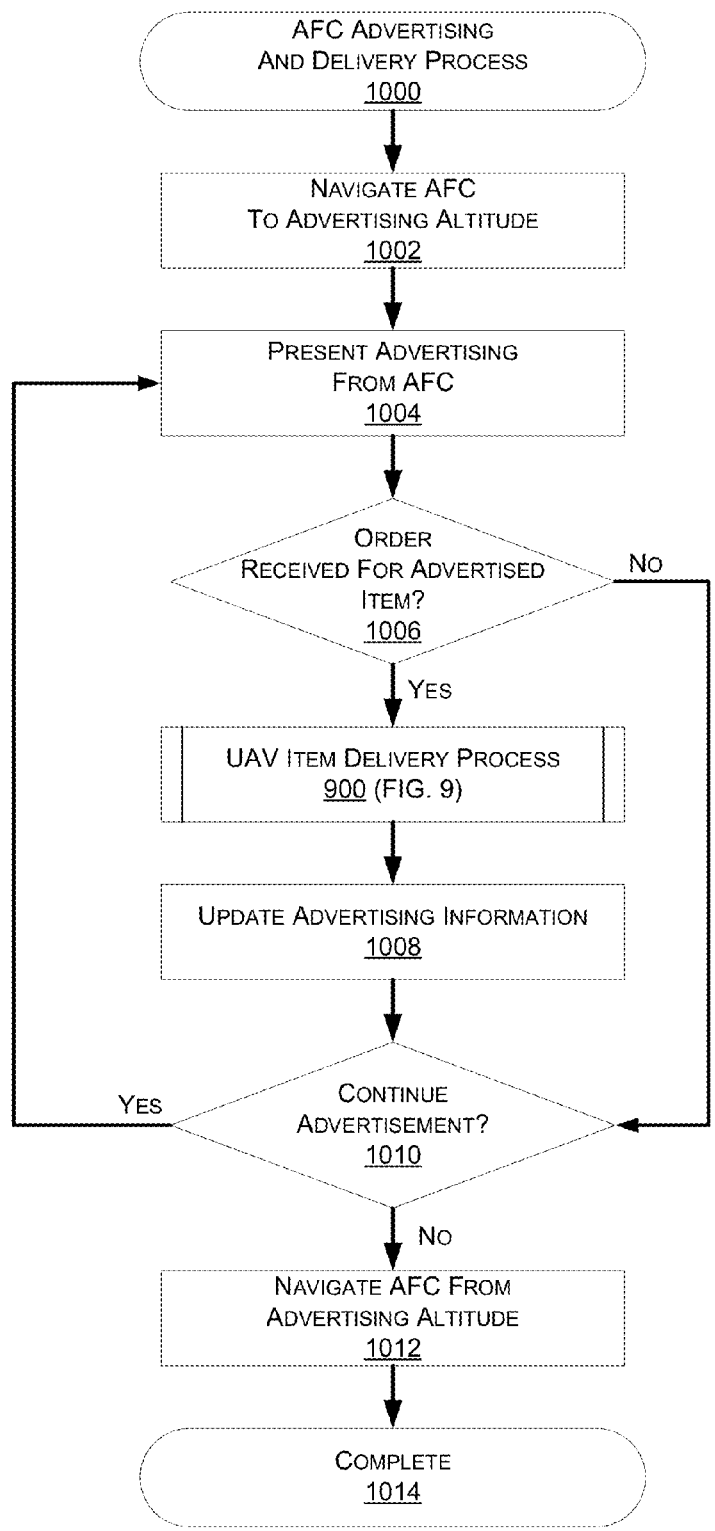
FIG. 10 is a flow diagram of an example airborne fulfillment center advertising and delivery process, according to an implementation.

FIG. 10 is a flow diagram of an example airborne fulfillment center advertising and delivery process 1000, according to an implementation. The example process 1000 begins by navigating the AFC to an advertising altitude, as in 1002. Any altitude at which an advertisement can be received from an AFC may be utilized. For example, the advertising altitude may be approximately 2,000 feet. At such an advertising altitude, the AFC is not in the typical commercial flight altitude and is at an altitude so that the AFC is viewable by users located near the AFC.

Once the AFC is positioned at the advertising height, the advertisement is presented from the AFC, as in 1004. The advertisement may be presented audibly, visually, and/or using other means. For example, a side portion of the AFC may include a display or a presentation device that can be used to visually present the advertisement. Alternatively, or in addition thereto, the AFC may include a speaker that can audibly output the advertisement.

The advertisement may be for any type of item, whether it is deliverable from the AFC or otherwise. For example, the advertisement may be for a service. In some implementations, the advertisement may relate to a quantity of items that are being sold for immediate delivery from the AFC. For example, the AFC may display an advertisement for an item and present a quantity of that item remaining that may be ordered for immediate delivery from the AFC. Other examples include advertisements for pre-release items, sale items, consumable items, etc.

As the advertisement is presented, a determination is made as to whether an order for the advertised item has been received, as in 1006. If it is determined that an order has not been received, the example process 1000 proceeds to block 1010 and determines if the advertisement is to continue, as discussed below. If an order for the advertised item is received, the UAV item delivery process 900 (discussed above with respect to FIG. 9) is performed and the item is delivered to the user.

As the item is delivered, the advertisement may be updated, as in 1008. For example, if the advertisement includes a quantity count for the number of items being sold as part of the advertisement, the quantity remaining may be updated to reflect the sold item.

A determination is also made as to whether the advertisement is to continue, as in 1010. For example, the advertisement may be scheduled to be presented for a defined period of time, until a defined quantity of the advertised item has been sold, and/or based on other factors. If it is determined that the advertisement is to continue, the example process 1000 returns to block 1004 and continues. However, if it is determined that the advertisement is not to continue (e.g., the time duration of the advertisement has expired, the quantity of items associated with the advertisement have been sold, etc.), the AFC may terminate presentation of the advertisement and navigate from the advertising altitude, as in 1012. For example, the AFC may navigate back up to the fulfillment center altitude where the AFC was previously positioned, the AFC may land, etc. After navigating from the advertising altitude, the example process 1000 completes, as in 1014.

Utilizing the AFC to advertise items for immediate delivery provides additional flexibility in inventory management and item promotion. For example, if it is determined that an item is overstocked at the AFC, rather than sending the items to another location using a shuttle, the items may be advertised at a reduced price to deplete the overstock of inventory. Likewise, if the AFC is scheduled to land for service, restocking and/or for other purposes, as part of the descent toward landing, the AFC may navigate to an advertisement altitude and advertise the sale of one or more of the items currently in inventory of the AFC.

As inventory, UAVs, supplies, etc., are depleted from the AFC, and/or during times of low activity, the AFC may descend and land. Alternatively, as discussed herein, shuttles may be utilized to deliver inbound items to the AFC so that the AFC can remain airborne for extended periods of time.

Figure 11:
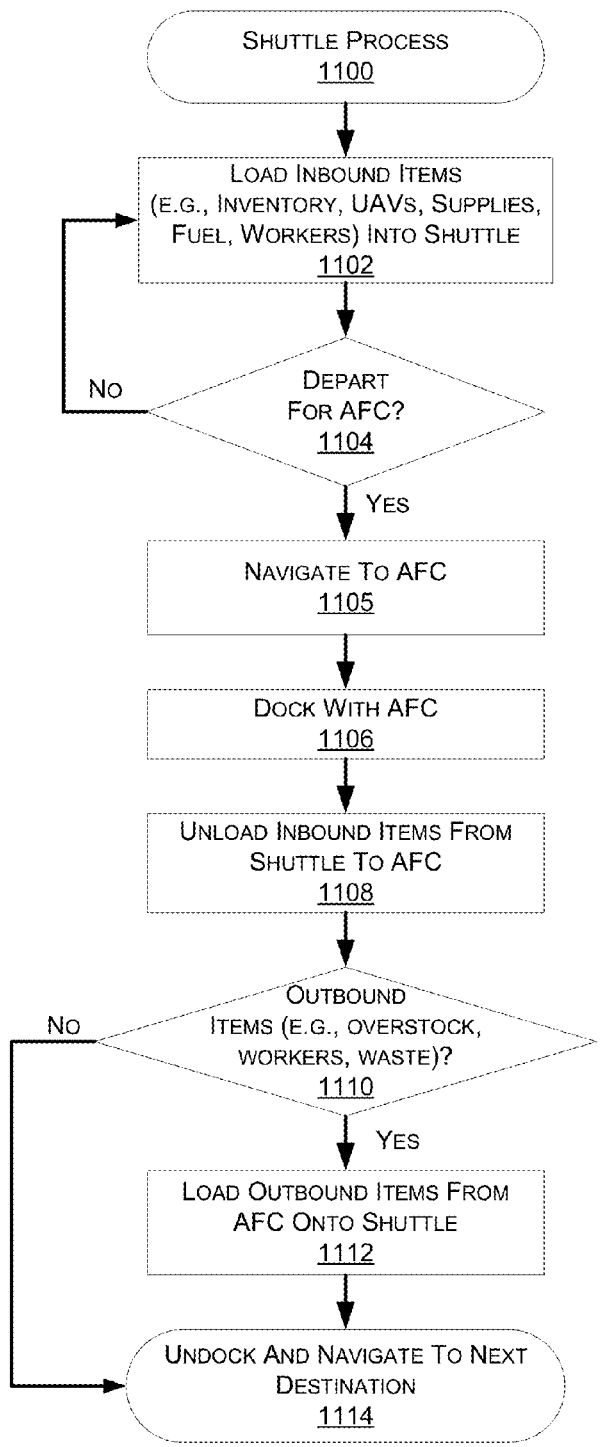
FIG. 11 is a flow diagram of an example shuttle process, according to an implementation.

FIG. 11 is a flow diagram of an example shuttle process 1100, according to an implementation. The example process 1100 begins when a shuttle is positioned on the ground at a shuttle replenishment location. A shuttle replenishment location may be any designated location at which a shuttle may be positioned.

As part of the example process 1100, inbound items that are to be transported to the AFC are loaded onto the shuttle, as in 1102. Inbound items may be any item that is to be transported to the AFC. For example, inbound items may be inventory, UAV, workers, fuel, supplies, contractors, etc. In some implementations, as discussed above, a shuttle may hold a variety of different types of inbound items. In other implementations, shuttles may be designed for one or more types of inbound items. For example, some shuttles may be partially or entirely designated for UAV transport. Such shuttles may be configured with charging stations to enable charging of UAVs during the transport from the shuttle replenishment location to the AFC. Likewise, tools and/or personnel necessary to service or repair UAVs may also be included on the shuttle. In other examples, shuttles may be partially or entirely designated for inventory transport and/or people (e.g., workers) transport. For example, some shuttles may include seats, safety equipment, etc., to ensure the safe transport of humans to and from the AFC.

As the shuttle is loaded with inbound items, a determination is made as to whether the shuttle is to depart for the AFC, as in 1104. Determining whether to depart for the AFC may be based on a variety of factors including, but not limited to, the type of inbound items being transported, the capacity of the shuttle, the need for the inbound items at the AFC, etc. For example, if the shuttle is used to transport workers to the AFC, the shuttle may be scheduled to depart the shuttle replenishment location at a designated time. Once the designated time is reached, the shuttle may depart. In another example, if the shuttle is transporting inventory and/or fuel, the need for the loaded inventory and/or the fuel at the AFC may be determined. If additional inventory, fuel and/or other items are in-route to the shuttle replenishment location, the estimated time until arrival of the additional inbound items may likewise be considered. Still further, the time until the next shuttle departure may likewise be considered in determining whether the shuttle is to depart for the AFC.

If it is determined that the shuttle is not to depart for the AFC, the example process 1100 returns to block 1102 and continues. If it is determined that the shuttle is to depart for the AFC, the shuttle departs the shuttle replenishment location and navigates to the AFC, as in 1105. The shuttle may be manually navigated to the AFC by an operator of the shuttle, navigated using automated controls and/or a combination thereof. As the shuttle navigates to the AFC, inbound items may be serviced. For example, UAVs may be charged by the shuttle, serviced and/or repaired as they are transported to the AFC.

When the shuttle arrives at the AFC, it is secured to and docked with the AFC, as in 1106. Securing and docking of the shuttle may be accomplished in a variety of manners depending on the shape and configuration of the AFC and the UAV. For example, a docking arm may extend from the AFC and/or the shuttle and mate the shuttle to the AFC, thereby securing the position of the shuttle with respect to the AFC and providing a channel through which inbound items may be transported from the shuttle to the AFC. In other implementations, the AFC may include a hangar or other opening into which the shuttle may navigate and become fully or partially enclosed within the AFC. As will be appreciated, any type of docking techniques may be utilized with the implementations discussed herein.

Upon docking and securing of the shuttle with the AFC, the inbound items are unloaded from the shuttle into the AFC, as in 1108. For example, inventory may be transported from the shuttle to a receiving location of the AFC where the items are inducted into inventory of the AFC and made available for picking and delivery. Likewise, the UAVs may be moved from the shuttle to a UAV staging area within the AFC where they may be serviced, charged, etc., while awaiting deployment instructions. Workers or other humans may likewise disembark from the shuttle into the AFC.

Once the inbound items to be delivered to the AFC have been removed from the shuttle, a determination is made as to whether outbound items are to be loaded onto the shuttle before the shuttle departs the AFC, as in 1110. Outbound items are any items that can be carried by the shuttle that are to be removed from the AFC. For example, outbound items may include overstock inventory, inventory that is to be shipped to another AFC or a ground based materials handling facility (referred to herein as transship inventory), damaged items, waste, workers, etc.

If it is determined that outbound items are to be loaded onto the AFC, the outbound items are loaded, as in 1112. As with inbound items, in some implementations, the shuttles may be designed for particular types of outbound items. For example, some shuttles may be configured to receive waste, damaged items, overstocked items and/or transshipments, while other shuttles may only receive humans. In some implementations, the destination of the shuttle after it departs the AFC may be considered when determining whether to load outbound items. For example, in some implementations, the shuttle may navigate to multiple AFCs delivering inbound items before the shuttle returns to earth. In such an example, non-humans may be loaded onto the shuttle and/or humans that are to be transported to another AFC may be loaded.

After the outbound items have been loaded, or if it is determined at block 1110 that no outbound items are to be loaded, the shuttle undocks from the AFC and navigates to a next scheduled destination (e.g., shuttle replenishment location, another AFC), as in 1114. In some implementations, similar to determining when a shuttle is to depart a shuttle replenishment location, a similar determination may be made as to when/whether a shuttle is to depart the AFC.

Figure 12:
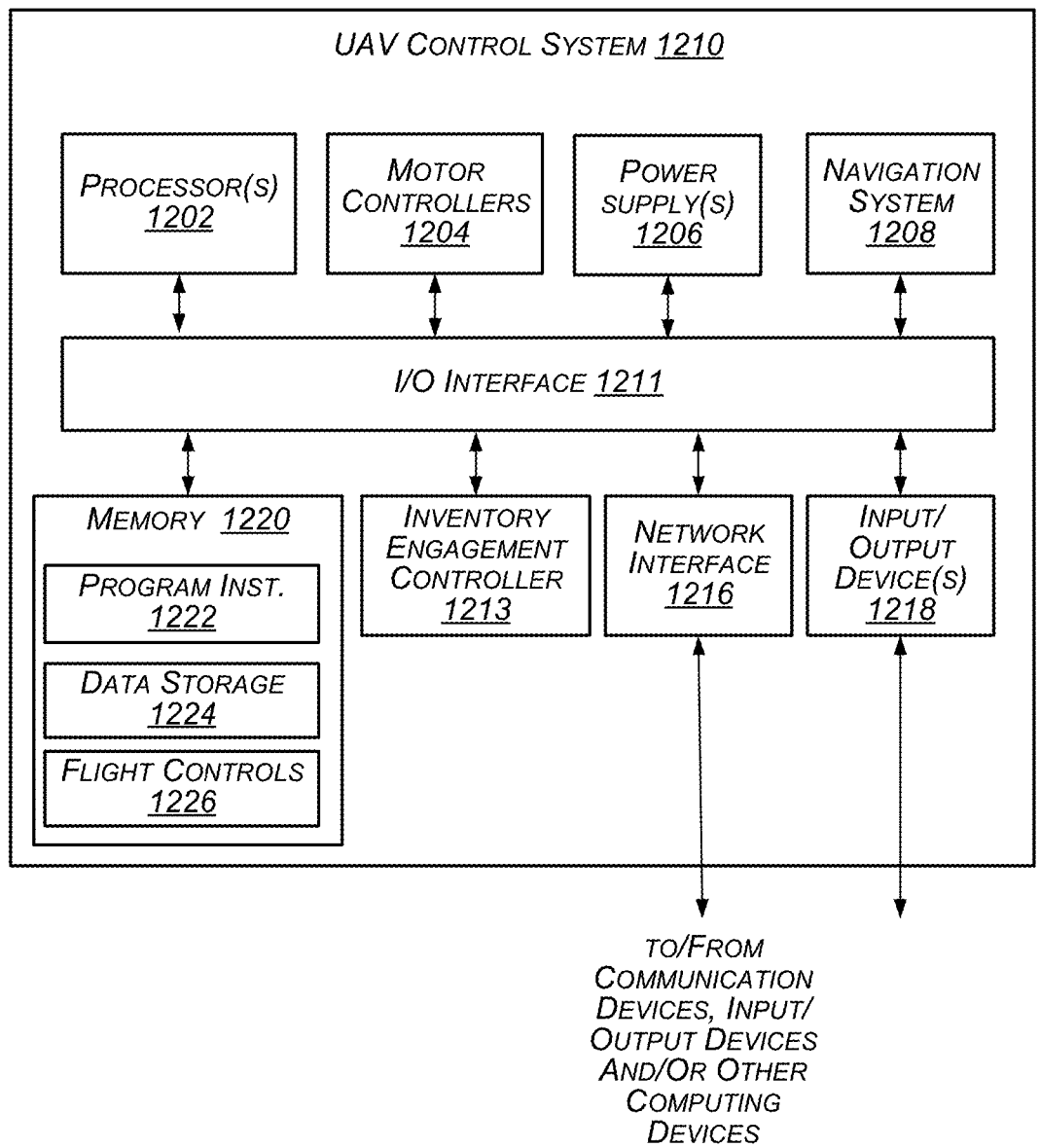
FIG. 12 is a block diagram of an example unmanned aerial vehicle control system, according to an implementation.

FIG. 12 is a block diagram illustrating an example UAV control system 1210 that may be utilized with any of the UAVs discussed herein, such as the UAV 612 of FIG. 6 or the UAV 712 of FIG. 7. In various examples, the block diagram may be illustrative of one or more aspects of the UAV control system 1210 that may be used to implement the various systems and methods discussed herein and/or to control operation of the UAV. In the illustrated implementation, the UAV control system 1210 includes one or more processors 1202, coupled to a memory, e.g., a non-transitory computer readable storage medium 1220, via an input/output (I/O) interface 1211. The UAV control system 1210 may also include motors controllers 1204, such as electronic speed controls (ESCs), power supply modules 1206 and/or a navigation system 1208. The UAV control system 1210 further includes an inventory engagement controller 1213, a network interface 1216, and one or more input/output devices 1218.

In various implementations, the UAV control system 1210 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions, data, flight paths, flight control parameters, component adjustment information, center of gravity information, and/or data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1220 as program instructions 1222, data storage 1224 and flight controls 1226, respectively. In other implementations, program instructions, data and/or flight controls may be received, sent or stored upon different types of computer-accessible media, such as non-transitory media, on similar media separate from the non-transitory computer readable storage medium 1220 or the UAV control system 1210. Generally speaking, a non-transitory, computer readable storage medium may include storage media or memory media such as magnetic or optical media, e.g., disk or CD/DVD-ROM, coupled to the UAV control system 1210 via the I/O interface 1211. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1216.

In one implementation, the I/O interface 1211 may be configured to coordinate I/O traffic between the processor(s) 1202, the non-transitory computer readable storage medium 1220, and any peripheral devices, the network interface or other peripheral interfaces, such as input/output devices 1218. In some implementations, the I/O interface 1211 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1211 may include support for devices attached through various types of peripheral buses, such as a variant of the Peripheral Component Interconnect (PCI) bus standard or the Universal Serial Bus (USB) standard, for example. In some implementations, the function of the I/O interface 1211 may be split into two or more separate components, such as a north bridge and a south bridge, for example. Also, in some implementations, some or all of the functionality of the I/O interface 1211, such as an interface to the non-transitory computer readable storage medium 1220, may be incorporated directly into the processor(s) 1202.

The motor controllers 1204 communicate with the navigation system 1208 and adjust the rotational speed of each lifting motor and/or the thrusting motor to stabilize the UAV and guide the UAV along a determined flight path.

The navigation system 1208 may include a global positioning system (GPS), indoor positioning system (IPS), or other similar system and/or sensors that can be used to navigate the UAV to and/or from a location. The inventory engagement controller 1213 communicates with the actuator(s) or motor(s) (e.g., a servomotor) used to engage and/or disengage items.

The network interface 1216 may be configured to allow data to be exchanged between the UAV control system 1210, other devices attached to a network, such as other computer systems (e.g., remote computing resources), and/or with UAV control systems of other UAVs. For example, the network interface 1216 may enable wireless communication between the UAV and a UAV control system that is implemented on one or more remote computing resources. For wireless communication, an antenna of a UAV or other communication components may be utilized. As another example, the network interface 1216 may enable wireless communication between numerous UAVs. In various implementations, the network interface 1216 may support communication via wireless general data networks, such as a Wi-Fi network. For example, the network interface 1216 may support communication via telecommunications networks, such as cellular communication networks, satellite networks, and the like.

Input/output devices 1218 may, in some implementations, include one or more displays, imaging devices, thermal sensors, infrared sensors, time of flight sensors, accelerometers, pressure sensors, weather sensors, etc. Multiple input/output devices 1218 may be present and controlled by the UAV control system 1210. One or more of these sensors may be utilized to assist in landing as well as to avoid obstacles during flight.

As shown in FIG. 12, the memory may include program instructions 1222, which may be configured to implement the example processes and or sub-processes described herein. The data storage 1224 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 1210 is merely illustrative and is not intended to limit the scope of the present disclosure. In particular, the control system may include any combination of hardware or software that can perform the indicated functions. The UAV control system 1210 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 1210. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 1210 may be transmitted to the UAV control system 1210 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Figure 13:
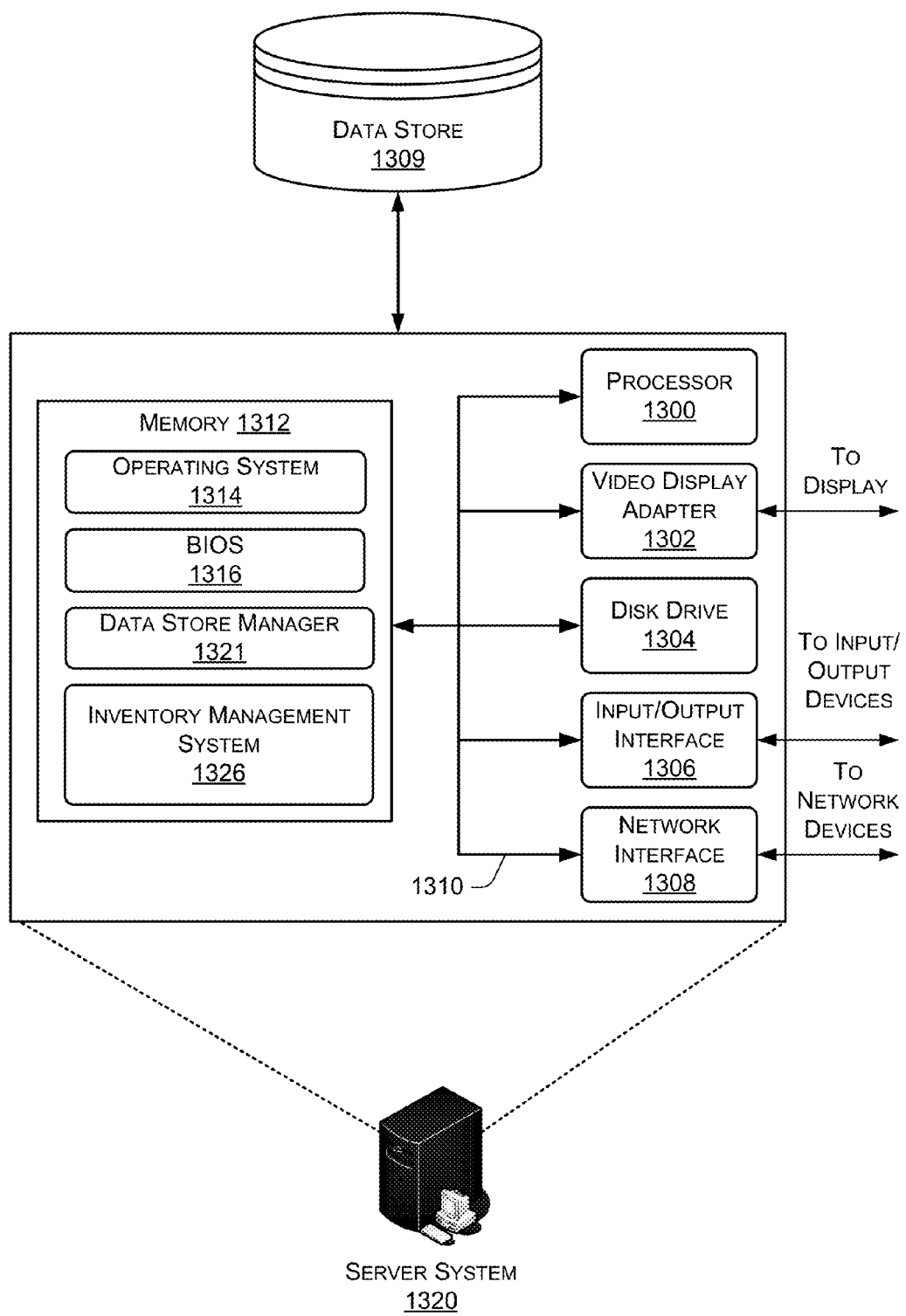
FIG. 13 is a block diagram of an illustrative implementation of a server system that may be used with various implementations.

FIG. 13 is a pictorial diagram of an illustrative implementation of a server system 1320 that may be used in the implementations described herein. The server system 1320 may include a processor 1300, such as one or more redundant processors, a video display adapter 1302, a disk drive 1304, an input/output interface 1306, a network interface 1308, and a memory 1312. The processor 1300, the video display adapter 1302, the disk drive 1304, the input/output interface 1306, the network interface 1308, and/or the memory 1312 may be communicatively coupled to each other by a communication bus 1310.

The video display adapter 1302 provides display signals to a display (not shown in FIG. 13) permitting an agent of the server system 1320 to monitor and configure operation of the server system 1320 and/or to provide information (e.g., regarding transportation and/or storage of an item by the AFC, shuttle and/or UAV). The input/output interface 1306 likewise communicates with external input/output devices not shown in FIG. 13, such as a mouse, keyboard, scanner, or other input and output devices that can be operated by an agent of the server system 1320. The network interface 1308 includes hardware, software, or any combination thereof, to communicate with other computing devices. For example, the network interface 1308 may be configured to provide communications between the server system 1320 and other computing devices, such as that of an AFC, materials handling facility, delivery location, UAV and/or shuttle, via a network.

The memory 1312 generally comprises random access memory (RAM), read-only memory (ROM), flash memory, and/or other volatile or permanent memory. The memory 1312 is shown storing an operating system 1314 for controlling the operation of the server system 1320. A binary input/output system (BIOS) 1316 for controlling the low-level operation of the server system 1320 is also stored in the memory 1312.

The memory 1312 additionally stores program code and data for providing network services to the AFC, shuttle, UAV, materials handling facility, and/or the inventory management system. The program instructions enable communication with a data store manager application 1321 to facilitate data exchange between the data store 1309 and the inventory management system.

As used herein, the term "data store" refers to any device or combination of devices capable of storing, accessing, and retrieving data, which may include any combination and number of data servers, databases, data storage devices and data storage media, in any standard, distributed or clustered environment. The server system 1320 can include any appropriate hardware and software for integrating with the data store 1309 as needed to execute aspects of one or more applications for an AFC, shuttle, materials handling facility, delivery location, UAV, and/or the inventory management system.

The data store 1309 can include several separate data tables, databases or other data storage mechanisms and media for storing data relating to a particular aspect. For example, the illustrated data store 1309 includes mechanisms for maintaining information related to operations, inventory, maps, GPS data, etc., which can be used to generate and deliver information to an AFC, shuttle, UAV, and/or inventory management system 1326. It should be understood that there might be additional aspects that can be stored in the data store 1309 and that additional data stores beyond the one illustrated may be included. The data store 1309 is operable, through logic associated therewith, to receive instructions from the server system 1320 and obtain, update or otherwise process data in response thereto.

The memory 1312 may also include the inventory management system 1326, discussed above. The inventory management system 1326 may be executable by the processor 1300 to implement one or more of the functions of the server system 1320. In one implementation, the inventory management system 1326 may represent instructions embodied in one or more software programs stored in the memory 1312. In another implementation, the inventory management system 1326 can represent hardware, software instructions, or a combination thereof.

The server system 1320, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An airborne fulfillment center ("AFC") apparatus, comprising:
    an airship that includes a lifting portion that contains a lighter than air gas;
    a fulfillment center coupled to the airship, wherein the fulfillment center is configured to store inventory that is transportable from the AFC while the AFC is airborne;
    a presentation component that outputs at least one advertisement, wherein the at least one advertisement corresponds to at least one of an item available for delivery from the AFC, a service, a pre-release item, a consumable item, or a sale item; and
    a computing component operable to at least:
        cause the AFC to aerially navigate to a first altitude at which the AFC is visible to a customer;
        present with the presentation component of the AFC the at least one advertisement;
        receive an order for the at least one of the item available for delivery from the AFC, the service, the pre-release item, the consumable item, or the sale item; and
        in response to the order, update the at least one advertisement to indicate a change in a quantity of the at least one of the item available for delivery from the AFC, the service, the pre-release item, the consumable item, or the sale item.

2. The AFC apparatus of claim 1, wherein the fulfillment center includes:
    an unmanned aerial vehicle ("UAV") deployment bay through which one or more UAVs may be deployed while the AFC is airborne.

3. The AFC apparatus of claim 1, wherein the fulfillment center includes:
    an unmanned aerial vehicle ("UAV") staging area, wherein one or more UAVs are staged at the UAV staging area prior to a deployment from the AFC.

4. The AFC apparatus of claim 1, further comprising:
    a docking bay configured to receive a shuttle and enable transfer of at least one of an inbound item or an outbound item between the AFC and the shuttle.

5. The AFC apparatus of claim 1, wherein the airship is at least one of a non-rigid airship, a semi-rigid airship, or a rigid airship.

6. The AFC apparatus of claim 1, wherein the AFC apparatus is configured to aerially carry over one-hundred tons.

7. The AFC apparatus of claim 1, wherein the presentation component presents the at least one advertisement at least one of audibly or visually.

8. A method to deliver an item from an airborne fulfillment center ("AFC"), the method comprising:
    presenting an advertisement from the AFC, wherein the advertisement corresponds to an item deliverable from the AFC using an unmanned aerial vehicle;
    receiving an order for an instance of the item;
    causing an unmanned aerial vehicle ("UAV") within the AFC to engage the instance of the item;
    causing the UAV to be deployed from the AFC; and
    causing the UAV to deliver the instance of the item.

9. The method of claim 8, wherein the UAV navigates using little or no power of the UAV as it descends from the AFC.

10. The method of claim 9, wherein the UAV navigates by manipulating at least one of an aileron of a wing of the UAV or by selectively engaging a motor of the UAV.

11. The method of claim 8, the method further comprising:
    causing the UAV to allow a propeller to freely rotate during a descent of the UAV from the AFC in response to a force of wind passing over the propeller during the descent, the rotation of the propeller acting as a generator and providing a charge to the UAV.

12. The method of claim 8, wherein the advertisement is presented audibly using a speaker of the AFC or visually using a presentation device of the AFC.

13. The method of claim 8, wherein the advertisement indicates a quantity of the item that is available for delivery from the AFC.

14. A method to deliver an item from an airborne fulfillment center ("AFC"), the method comprising:
    presenting an advertisement from the AFC, wherein the advertisement corresponds to at least one of an item available for delivery from the AFC, a service, a pre-release item, a consumable item, or a sale item;
    receiving an order for an instance of an item contained in the AFC;
    causing an unmanned aerial vehicle ("UAV") within the AFC to engage the instance of the item;
    causing the UAV to be deployed from the AFC; and
    causing the UAV to deliver the instance of the item.

15. The method of claim 8, further comprising:
    causing the UAV to disengage the instance of the item at a delivery location; and aerially navigating the UAV away from the delivery location.

16. The method of claim 15, wherein the advertisement is for the item and the order for the item is received subsequent to presenting the advertisement.

17. A method to deliver an item from an airborne fulfillment center ("AFC"), the method comprising:
   causing the AFC to aerially navigate to a first altitude at which the AFC is visible to a customer;
   determining a quantity of an item contained in an inventory of the AFC; and
   presenting from the AFC an advertisement for the item, wherein the advertisement indicates a quantity of the item.

18. The method of claim 17, further comprising:
   receiving an order for the item;
   causing an instance of the item to be delivered from the AFC;
   determining that the advertisement for the item is to continue; and
   updating the advertisement to indicate a remaining quantity of the item available for delivery from the AFC.

19. The method of claim 18, wherein it is determined that the advertisement is to continue based at least in part on a quantity of the item remaining in the AFC or a duration time of the advertisement.

20. The method of claim 17, further comprising:
   receiving an order for the item;
   causing an instance of the item to be delivered from the AFC;
   determining that the advertisement for the item is not to continue;
   terminating a presentation of the advertisement; and
   causing the AFC to aerially navigate to a second altitude.

* * * * *